(12) United States Patent
Oosawa

(10) Patent No.: US 6,915,003 B2
(45) Date of Patent: Jul. 5, 2005

(54) METHOD AND APPARATUS FOR MATCHING POSITIONS OF IMAGES

(75) Inventor: Akira Oosawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 559 days.

(21) Appl. No.: 09/853,639

(22) Filed: May 14, 2001

(65) Prior Publication Data

US 2001/0048757 A1 Dec. 6, 2001

(30) Foreign Application Priority Data

May 12, 2000 (JP) ........................................ 2000-140331
Feb. 21, 2001 (JP) ........................................ 2001-044812

(51) Int. Cl.[7] ................................................ G06K 9/00
(52) U.S. Cl. ........................ 382/130; 382/209; 378/20
(58) Field of Search ............................... 382/128–134, 382/209, 151, 215–220, 278, 294, 298; 378/20, 98.11, 98.12, 170, 62, 165, 176; 600/410, 443, 467, 425, 463; 250/39, 559.05, 394

(56) References Cited

U.S. PATENT DOCUMENTS 5,153,444 A * 10/1992 Maeda et al. .......... 250/559.05
5,359,513 A * 10/1994 Kano et al. .................. 382/128
5,572,566 A * 11/1996 Suzuki et al. ............... 378/98.2
6,317,510 B1 * 11/2001 Murakami ................... 382/132
6,563,942 B2 * 5/2003 Takeo et al. ................. 382/132
6,563,943 B1 * 5/2003 Sasada ........................ 382/132
6,600,831 B1 * 7/2003 Sasada ........................ 382/132
6,640,000 B1 * 10/2003 Fey et al. .................... 382/128

* cited by examiner

*Primary Examiner*—Kanjishai Patel
*Assistant Examiner*—Abolfazi Tabatabai
(74) *Attorney, Agent, or Firm*—Sughrue Mion, PLLC

(57) ABSTRACT

Approximate position matching processing is firstly performed with respect to entire areas of two images of a single same object. Selection is then made to find local area limited regions, between which a degree of shift is high, in the two images, whose positions have been approximately matched with each other by the approximate position matching processing. Position re-matching processing is then performed with respect to at least the local area limited regions, which have thus been selected. The approximate position matching processing may be global position matching processing, local position matching processing, or a combination of the global position matching processing and the local position matching processing.

23 Claims, 15 Drawing Sheets

(SUBTRACTION PROCESSING APPARATUS)

F I G . 18
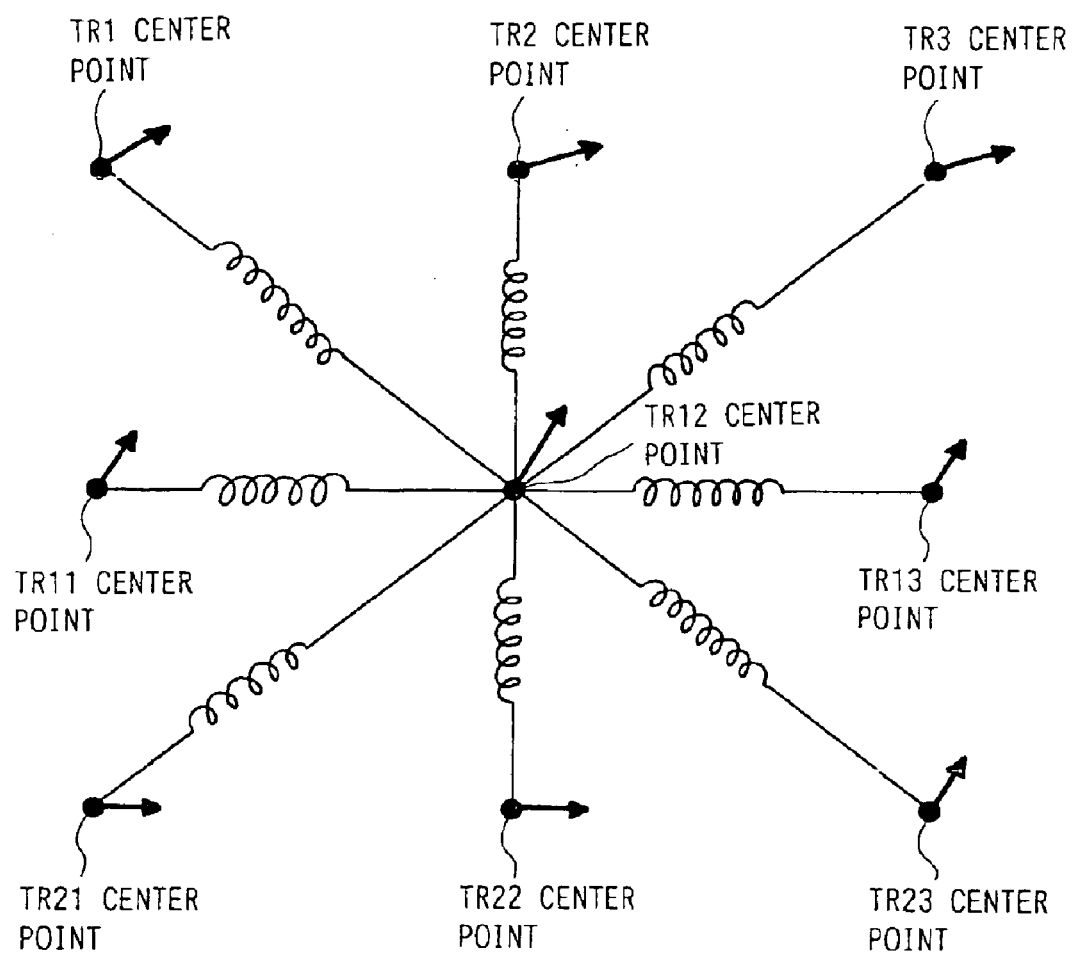

METHOD AND APPARATUS FOR MATCHING POSITIONS OF IMAGES

BACKGROUND OF THE INVENTION

1. Field of the Invention

This invention relates to a method and apparatus for matching positions of images. This invention particularly relates to an improvement in position matching of two images of a single same object.

2. Description of the Related Art

Techniques for comparing at least two images of a single same object, finding a difference between the images, and making an examination of the object, or the like, in accordance with the difference between the images have heretofore been conducted in various fields.

For example, in the fields of production of industrial products, there have heretofore been conducted techniques for comparing an image of a certain product, which image has been recorded when the product is in a state of a new article, and an image of the product, which image has been recorded after a durability test has been made on the product, paying attention to part of the product, at which the difference between the images is large, and determining part of the product, at which the durability is to be enhanced. Also, in the medical fields, there have heretofore been conducted techniques for comparing a plurality of radiation images of a certain diseased part of a patient, which radiation images have been recorded in a time series mode, with one another, finding the condition of advance of the disease or the condition of cure of the disease, and determining a plan for treatment of the disease.

As described above, the techniques for comparing at least two images are conducted ordinarily in various fields. For making the comparison of the at least two images, the at least two images are often displayed on an image display device, and the like. Specifically, the images having been recorded are transformed into image density signals or luminance signals, and visible images are reproduced from the image density signals or luminance signals and displayed on the image display device, and the like. Alternatively, visible images are reproduced on a medium, such as film, by the utilization of a printer.

In cases where at least two images, which are to be compared with each other, are outputted, the images are ordinarily outputted so as to stand side by side with each other. In cases where the comparison is made, a matter of primary concern for the person, who sees the outputted images, is the difference between the images. However, it is not easy to find the difference between the images, which are merely located so as to stand side by side with each other. Particularly when the difference is small, it is difficult to find the difference in the manner described above. Therefore, there is a strong demand for enhancement of performance of the comparison.

Accordingly, ordinarily, techniques for performing inter-image operation processing, such as a subtraction process, on corresponding pixels in the at least two images to be compared with each other, and thereby extracting and enhancing the difference between the images are conducted. (One of such techniques is proposed in, for example, Japanese Patent Application No. 11(1999)-342900.) In cases where only the difference between the images is thus extracted and enhanced, the difference between the images is capable of being reliably perceived by the person, who sees the outputted image. As a result, the diseased part, which is advancing or curing, is capable of being found reliably.

In cases where the inter-image operation processing is to be performed, it is necessary that positions of the two images, which are to be subjected to the comparison, i.e. the inter-image operation processing, be accurately matched with each other. If the positions of the two images are not accurately matched with each other, an artifact of structures embedded in the images will occur from the inter-image operation processing, which is performed on the corresponding pixels in the images.

Besides the images having been recorded successively in the time series mode, two images, which have been acquired at two different points of time apart from each other, are often subjected to the comparison. In such cases, ordinarily, a shift occurs between the two acquired images due to a deviation in orientation of the object during the image recording operation, error, and the like. Therefore, before the inter-image operation processing is performed, it is necessary for the shift to be compensated for.

Accordingly, approximate position matching processing is performed on the entire area of at least either one of the two images of the same object, which images are to be compared with each other. As the approximate position matching processing, global position matching processing (a linear transform, e.g. an affine transform), such as rotating processing, parallel translation, and image size enlargement or reduction processing, may be performed. Alternatively, as the approximate position matching processing, local position matching processing with nonlinear strain transform processing (i.e., warping) in accordance with a corresponding position relationship, which has been obtained from template matching for each of local area limited regions, may be performed. The nonlinear strain transform processing may be performed with, for example, curve fitting utilizing two-dimensional polynomials. As another alternative, as the approximate position matching processing, a combination of the global position matching processing and the local position matching processing may be performed. (Techniques for performing the approximate position matching processing are described in, for example, Japanese Unexamined Patent Publication Nos. 7(1995)-37074 and 8(1996)-335721.) With the approximate position matching processing described above, position matching is capable of being effected to a certain extent with respect to the entire areas of the images.

However, for example, in cases where image patterns of similar textures are embedded in adjacent local area limited regions as in the cases of rib image patterns in chest radiation images, the approximate position matching processing described above has the problems in that a shift often remains between certain local area limited regions.

SUMMARY OF THE INVENTION

The primary object of the present invention is to provide a method of matching positions of images, wherein a shift between two images to be compared with each other is suppressed more reliably than with conventional image position matching techniques, and position matching is performed accurately.

Another object of the present invention is to provide an apparatus for carrying out the method of matching positions of images.

A method and apparatus for matching positions of images in accordance with the present invention are characterized by performing approximate position matching processing with respect to entire areas of two images, selecting certain local area limited regions, between which a degree of shift is high even after the approximate position matching processing has been performed, and performing position re-matching processing with respect to only the selected local area limited regions and, when necessary, regions neighboring with the selected local area limited regions, such that the degree of shift between the local area limited regions, between which the degree of shift was high, may be suppressed, and such that the degree of shift between the entire areas of the images may be suppressed more reliably than with conventional image position matching techniques.

Specifically, the present invention provides a method of matching positions of images, in which positions of two images of a single same object are matched with each other, the method comprising the steps of:

i) performing approximate position matching processing with respect to entire areas of the two images, ii) selecting local area limited regions, between which a degree of shift is high, in the two images, whose positions have been approximately matched with each other by the approximate position matching processing, and iii) performing position re-matching processing with respect to at least the local area limited regions, which have thus been selected.

In the method of matching positions of images in accordance with the present invention, the object may be one of various objects, such as human bodies, animals, plants, industrial products, geographical features, celestial structures, and scenes.

Also, the two images of the single same object should preferably be the images subjected to inter-image operation processing, in which the position matching should be performed at a high accuracy. The inter-image operation processing should preferably be a subtraction process performed on corresponding pixels in the two images. In such cases, the subtraction process may be a simple subtraction or a weighted subtraction. An inter-image operation processed image, which has been obtained from the subtraction process, is ordinarily referred to as the subtraction image. By way of example, the subtraction image may be an energy subtraction image obtained with the simple subtraction or the weighted subtraction performed on two original images, which have been formed with radiation having different energy distributions and approximately simultaneously (one of which is a high energy image having been formed with radiation having a high energy level, i.e. an ordinary radiation image, and the other of which is a low energy image having been formed with radiation having a low energy level, i.e. a high energy suppressed image) Alternatively, the subtraction image may be a temporal (time difference) subtraction image obtained from two original images, which have been recorded at two different points of time apart from each other. As another alternative, the subtraction image may be a digital subtraction angiography image obtained from two original images of blood vessels, which images have been recorded before injection of contrast media and after injection of the contrast media.

As described above, the two images of the single same object may be, for example, the two radiation images of an identical site of the single same object, which images have been recorded at two different points of time apart from each other. However, the two images of the single same object are not limited to the two radiation images described above, and the like. For example, the two images of the single same object may be two image areas, which are embedded in a single image and which represent sites having approximately identical shapes (e.g., the right and left lungs, or the right and left mammae). Specifically, the two images are not limited to two different images and may be two different image areas embedded in a single same image.

The two images described above should preferably be the medical radiation images.

In the method of matching positions of images in accordance with the present invention, the approximate position matching processing should preferably be global position matching processing for performing transform processing (such as an affine transform) comprising at least one kind of processing, which is among rotating processing, parallel translation, and image size enlargement or reduction processing, on an entire area of at least either one of the two images.

Alternatively, in the method of matching positions of images in accordance with the present invention, the approximate position matching processing should preferably be local position matching processing for:

setting a plurality of template regions, which are small regions, in one of the two images, setting a plurality of search regions, each of which corresponds to one of the template regions having been set in the one image and is larger than each of the template regions, in the other image, determining a subregion in each of the search regions, in which subregion an image pattern approximately coincides with the image pattern within the corresponding template region, and performing nonlinear strain transform processing (e.g., a nonlinear strain transform utilizing curve fitting with two-dimensional polynomials) on the entire area of at least either one of the two images and in accordance with corresponding position relationships between the subregions, which have thus been determined, and the corresponding template regions, such that the two images approximately coincide with each other.

With the global position matching processing or the local position matching processing described above, as the approximate position matching with respect to the entire areas of the two images, shifts between the two images are capable of being suppressed to a certain extent. As another alternative, in the method of matching positions of images in accordance with the present invention, the approximate position matching processing may be a combination of the global position matching processing described above and the local position matching processing described above, which is performed after the global position matching processing. (Examples of the techniques for performing the combination of the global position matching processing and the local position matching processing are described in, for example, Japanese Unexamined Patent Publication Nos. 7(1995)-37074 and 8(1996)-335721.) As the subregion in each of the search regions, for example, a subregion, which is associated with the largest cross correlation value between the subregion and the corresponding template region, may be determined. Alternatively, as the subregion in each of the search regions, a subregion, which is associated with the smallest value of the total sum of absolute values of pixel value differences between the subregion and the corresponding template region, may be determined.

Also, in the method of matching positions of images in accordance with the present invention, the selection of the local area limited regions, between which the degree of shift is high, may be performed by manually and arbitrarily setting the local area limited regions, between which the degree of shift is high, in the two images. Alternatively, the selection of the local area limited regions, between which the degree of shift is high, may be performed by automatically setting a plurality of local area limited regions over the entire area of each of the two images regardless of the degree of shift, calculating the degree of shift between corresponding local area limited regions in the two images with respect to each of sets of the corresponding local area limited regions in the two images, and automatically selecting the local area limited regions, between which the degree of shift is high, in the two images in accordance with the thus calculated degrees of shift. Such that the labor for the manual setting may be eliminated, the selection of the local area limited regions, between which the degree of shift is high, should preferably be performed automatically. In such cases, the degree of shift between the corresponding local area limited regions should preferably be calculated as a total sum value of absolute values of pixel value differences between corresponding pixels in the corresponding local area limited regions in the two images, and the selection of the local area limited regions, between which the degree of shift is high, should preferably be made by performing threshold value processing on the total sum value of the absolute values of the pixel value differences between the corresponding pixels in the corresponding local area limited regions. Alternatively, as the degree of shift, one of other index values (e.g., a normalized cross correlation value) may be employed. By the utilization of the index value, the local area limited regions, between which the degree of shift is high, may be selected. Further, as the corresponding local area limited regions in the two images, regions having an identical center point and an identical shape (e.g., rectangular regions) in the two images may be employed. In cases where the local area limited regions, between which the degree of shift is high, are to be selected manually, a technique should preferably be employed wherein, when a certain local area limited region is set in one of the two images, a local area limited region in the other image, which region has spatial coordinates identical with the spatial coordinates of the certain local area limited region having been set in the one image and has a size identical with the size of the certain local area limited region having been set in the one image, is set automatically. Ordinarily, it is not easy to manually and accurately set the regions having the identical spatial coordinates and the identical size in the two images.

In the method of matching positions of images in accordance with the present invention, the position re-matching processing is performed with respect to at least the selected local area limited regions. Specifically, the position re-matching processing is performed primarily with respect to the selected local area limited regions. However, in cases where only the selected local area limited regions are subjected to the position re-matching processing, if local area limited regions adjacent to the selected local area limited regions are not selected for the position re-matching processing, there will be the risk that a shift will occur at the boundary between the local area limited region in one image, which region has been selected and subjected to the position re-matching processing, and the adjacent local area limited region in the image, which region has not been selected and has not been subjected to the position re-matching processing. Therefore, when necessary, besides the selected local area limited regions, regions neighboring with the selected local area limited regions may also be subjected to the position re-matching processing. The term "performing position re-matching processing with respect to at least selected local area limited regions" as used herein does not mean that the images containing the local area limited regions, which have been selected, and all of the local area limited regions, which have not been selected, are subjected as a whole to the position re-matching processing.

In the method of matching positions of images in accordance with the present invention, the position re-matching processing should preferably be a processing for:

setting a template region in the local area limited region in one of the two images, the setting of the template region being performed with respect to each of sets of the corresponding local area limited regions in the two images, between which local area limited regions the degree of shift is high, setting a search region in the local area limited region in the other image, the setting of the search region being performed with respect to each of the sets of the corresponding local area limited regions in the two images, between which local area limited regions the degree of shift is high, determining a subregion within the search region, in which subregion a degree of image pattern coincidence with the corresponding template region is high, calculating a corresponding position relationship between the template region and the corresponding subregion, iterating operations, in which sizes of the template region and the search region are reduced in stages, the template region and the search region having the sizes reduced in stages are set in accordance with the thus calculated corresponding position relationship, and a corresponding position relationship between the template region and the corresponding subregion is calculated successively, an ultimate corresponding position relationship being thereby calculated with respect to each of the sets of the corresponding local area limited regions in the two images, between which local area limited regions the degree of shift is high, and performing transform processing on at least either one of the two images, whose positions have been approximately matched with each other by the approximate position matching processing, and in accordance with the ultimate corresponding position relationships that have been calculated ultimately with respect to the sets of the corresponding local area limited regions in the two images, between which local area limited regions the degree of shift is high, such that the corresponding local area limited regions in the two images, between which local area limited regions the degree of shift is high, approximately coincide with each other.

In the manner described above, the sizes of the template region and the search region may be reduced in stages, the corresponding position relationship may be calculated successively such that the degree of image pattern coincidence may become high, and the position matching may be performed in accordance with the calculated corresponding position relationship. In such cases, the image as a whole is capable of being prevented from distorting unnaturally, and the shift between the two images is capable of being suppressed more reliably than with the conventional image position matching techniques. Also, the shift between the two images is capable of being eliminated accurately.

Specifically, the accuracy of the position matching between the local area limited regions is capable of being enhanced by calculating the corresponding positions in a good position matching state (i.e., in a high degree of coincidence) by the utilization of the small regions (i.e., the template region and the search region). In such cases, in order for the position matching accuracy to be enhanced, the sizes of the utilized regions should preferably be as small as possible. However, if the small regions are merely utilized for calculating the corresponding positions in a good position matching state (i.e., the optimum corresponding positions), a local minimum phenomenon, wherein the highest degree of coincidence is obtained with respect to a subregion, which is not the correct optimum corresponding position, within the search region, will often occur. In such cases, the problems will occur in that the optimum corresponding position, which is calculated for each of the local area limited regions, becomes a position which is capable of being obtained only when the local area limited region is translated in a direction markedly different from the direction of translation of an adjacent local area limited region. As a result, the image pattern within the local area limited region will distort unnaturally. Therefore, in the method of matching positions of images in accordance with the present invention, as described above, in order for the optimum corresponding positions to be calculated, the corresponding position relationships should preferably be calculated in stages by reducing the sizes of the regions in stages. In this manner, the local minimum phenomenon is capable of being prevented from occurring, and the image pattern within the local area limited region is capable of being prevented from distorting unnaturally.

The present invention also provides an apparatus for carrying out the method of matching positions of images in accordance with the present invention. Specifically, the present invention also provides an apparatus for matching positions of images, in which positions of two images of a single same object are matched with each other, the apparatus comprising:

i) approximate position matching processing means for performing approximate position matching processing with respect to entire areas of the two images, ii) region selecting means for selecting local area limited regions, between which a degree of shift is high, in the two images, whose positions have been approximately matched with each other by the approximate position matching processing, and iii) position re-matching processing means for performing position re-matching processing with respect to at least the local area limited regions, which have been selected by the region selecting means.

In the apparatus for matching positions of images in accordance with the present invention, the approximate position matching processing means should preferably be global position matching processing means, which performs global position matching processing for performing transform processing comprising at least one kind of processing, which is among rotating processing, parallel translation, and image size enlargement or reduction processing, on an entire area of at least either one of the two images.

Alternatively, in the apparatus for matching positions of images in accordance with the present invention, the approximate position matching processing means should preferably comprise:

a) template matching processing means for:

setting a plurality of template regions, which are small regions, in one of the two images, setting a plurality of search regions, each of which corresponds to one of the template regions having been set in the one image and is larger than each of the template regions, in the other image, and determining a subregion in each of the search regions, in which subregion an image pattern approximately coincides with the image pattern within the corresponding template region, and b) local position matching processing means, which performs local position matching processing for performing nonlinear strain transform processing on the entire area of at least either one of the two images and in accordance with corresponding position relationships between the subregions and the corresponding template regions, the corresponding position relationships having been obtained from the template matching processing means, such that the two images approximately coincide with each other.

As another alternative, in the apparatus for matching positions of images in accordance with the present invention, the approximate position matching processing means may be a combination of the global position matching processing means described above, the template matching processing means described above, and the local position matching processing means described above.

Also, in the apparatus for matching positions of images in accordance with the present invention, the region selecting means may be constituted such that the selection of the local area limited regions, between which the degree of shift is high, is performed by manually and arbitrarily setting the local area limited regions, between which the degree of shift is high, in the two images. Alternatively, the region selecting means may be constituted such that the selection of the local area limited regions, between which the degree of shift is high, is performed by automatically setting a plurality of local area limited regions over the entire area of each of the two images regardless of the degree of shift, calculating the degree of shift between corresponding local area limited regions in the two images with respect to each of sets of the corresponding local area limited regions in the two images, and automatically selecting the local area limited regions, between which the degree of shift is high, in the two images in accordance with the thus calculated degrees of shift. Such that the labor for the manual setting may be eliminated, the region selecting means should preferably be constituted such that the selection of the local area limited regions, between which the degree of shift is high, is performed automatically. In such cases, the region selecting means should more preferably be constituted such that the degree of shift between the corresponding local area limited regions is calculated as a total sum value of absolute values of pixel value differences between corresponding pixels in the corresponding local area limited regions in the two images, and the selection of the local area limited regions, between which the degree of shift is high, is made by performing threshold value processing on the total sum value of the absolute values of the pixel value differences between the corresponding pixels in the corresponding local area limited regions.

In the apparatus for matching positions of images in accordance with the present invention, the position re-matching processing means should preferably comprise:

a) staged template matching processing means for:

setting a template region in the local area limited region in one of the two images, the setting of the template region being performed with respect to each of sets of the corresponding local area limited regions in the two images, between which local area limited regions the degree of shift is high, setting a search region in the local area limited region in the other image, the setting of the search region being performed with respect to each of the sets of the corresponding local area limited regions in the two images, between which local area limited regions the degree of shift is high, determining a subregion within the search region, in which subregion a degree of image pattern coincidence with the corresponding template region is high, calculating a corresponding position relationship between the template region and the corresponding subregion, and iterating operations, in which sizes of the template region and the search region are reduced in stages, the template region and the search region having the sizes reduced in stages are set in accordance with the thus calculated corresponding position relationship, and a corresponding position relationship between the template region and the corresponding subregion is calculated successively, in order to calculate an ultimate corresponding position relationship with respect to each of the sets of the corresponding local area limited regions in the two images, between which local area limited regions the degree of shift is high, and b) partial position matching processing means for performing transform processing on at least either one of the two images, whose positions have been approximately matched with each other by the approximate position matching processing, and in accordance with the ultimate corresponding position relationships that have been calculated ultimately with respect to the sets of the corresponding local area limited regions in the two images, between which local area limited regions the degree of shift is high, such that the corresponding local area limited regions in the two images, between which local area limited regions the degree of shift is high, approximately coincide with each other.

In such cases, the staged template matching processing means may be means for:

setting a plurality of small regions around each of the corresponding local area limited regions in the two images, between which local area limited regions the degree of shift is high, in at least one stage among the stages associated with the operation for reducing the sizes of the template region and the search region in stages, calculating a corresponding position relationship between the corresponding small regions in the two images, the calculation being made with respect to each of sets of the corresponding small regions in the two images, constraining the template region and the small regions, which surround the template region, with one another, and/or constraining the corresponding subregion and the small regions, which surround the subregion, with one another, the constraint being performed with constraining forces in accordance with the corresponding position relationship, which has been calculated with respect to the template region and the corresponding subregion, and the corresponding position relationships, which have been calculated with respect to the sets of the corresponding small regions in the two images, calculating a new relative corresponding position relationship with respect to the template region and the corresponding subregion in accordance with the constraining forces, and utilizing the thus calculated new relative corresponding position relationship as the corresponding position relationship between the template region and the corresponding subregion in each of the stages.

The term "plurality of small regions" as used herein means various regions, which are capable of being located around each local area limited region. For example, in cases where the local area limited region has a rectangular shape, the small regions may be eight rectangular small regions, which have sizes approximately identical with the size of the local area limited region and surround the local area limited region in a onefold manner. Alternatively, in such cases, the small regions may be 16 rectangular small regions, which have sizes approximately identical with the size of the local area limited region and surround the local area limited region in a twofold manner.

As described above, the constraint is performed with the constraining forces in accordance with the corresponding position relationship, which has been calculated with respect to the template region and the corresponding subregion, and the corresponding position relationships, which have been calculated with respect to the sets of the corresponding small regions in the two images. (Each of the template region and the corresponding subregion will hereinbelow be referred to as the center region.) Specifically, at least either one of the center regions is constrained with the constraining forces, which are defined by differences between the corresponding position relationship with respect to the center regions and the corresponding position relationships with respect to the sets of the corresponding small regions in the two images, or which are defined by results of other operation processing. For example, as the constraining force, it is possible to employ an elasticity force, such as a spring force, which is obtained in cases where the difference between the corresponding position relationship with respect to the center regions and the corresponding position relationship with respect to each of the sets of the corresponding small regions in the two images is taken as "displacement quantity." Alternatively, as the constraining force, it is possible to employ an attractive force, such as a coulomb force, which is obtained in cases where the corresponding position relationship with respect to the center regions and the corresponding position relationship with respect to each of the sets of the corresponding small regions in the two images are taken as "electric charges" or "magnetic charges." In particular, such that the calculations may be conducted quickly, the elasticity force undergoing linear proportion should preferably be employed as the constraining force.

The elasticity modulus should preferably be variable with respect to each of the surrounding small regions. For example, the elasticity modulus may be altered in accordance with the distance between the center region and each of the surrounding small regions.

Also, as described above, a calculation is made in accordance with the constraining forces to find the new relative corresponding position relationship with respect to the template region and the corresponding subregion. Specifically, for example, in cases where the center region and the surrounding small regions are constrained with one another by the constraining forces with the springs, a value of the corresponding position relationship, by which the center region is pulled back due to the constraining forces (elasticity forces) with the springs, may be subtracted from the original value of the corresponding position relationship. In this manner, the new relative corresponding position relationship with respect to the template region and the corresponding subregion may be calculated. The new relative corresponding position relationship with respect to the template region and the corresponding subregion may be calculated in the same manner also in cases where the attractive force, such as the coulomb force, is employed as the constraining force in lieu of the elasticity force.

With the method and apparatus for matching positions of images in accordance with the present invention, the approximate position matching processing is performed with respect to the entire areas of the two images, and only the certain local area limited regions, between which the degree of shift is high even after the approximate position matching processing has been performed, are selected. Also, the position re-matching processing is performed with respect to only the selected local area limited regions and, when necessary, the regions neighboring with the selected local area limited regions. Therefore, in cases where image patterns of similar textures are embedded in adjacent local area limited regions as in the cases of rib image patterns in chest radiation images, and a shift remains between certain local area limited regions after the approximate position matching processing has been performed, the degree of shift between the local area limited regions, between which the degree of shift was high, is capable of being suppressed. Accordingly, the degree of shift between the entire areas of the images is capable of being suppressed more reliably than with the conventional image position matching techniques, and the position matching accuracy is capable of being enhanced.

BRIEF DESCRIPTION OF THE DRAWINGS

FIG. 18 is a conceptual view showing how a shift vector of a template ROI at a center region and shift vectors of surrounding template ROI's are constrained with one another by virtual springs.

DESCRIPTION OF THE PREFERRED EMBODIMENTS

The present invention will hereinbelow be described in further detail with reference to the accompanying drawings.

Figure 1:
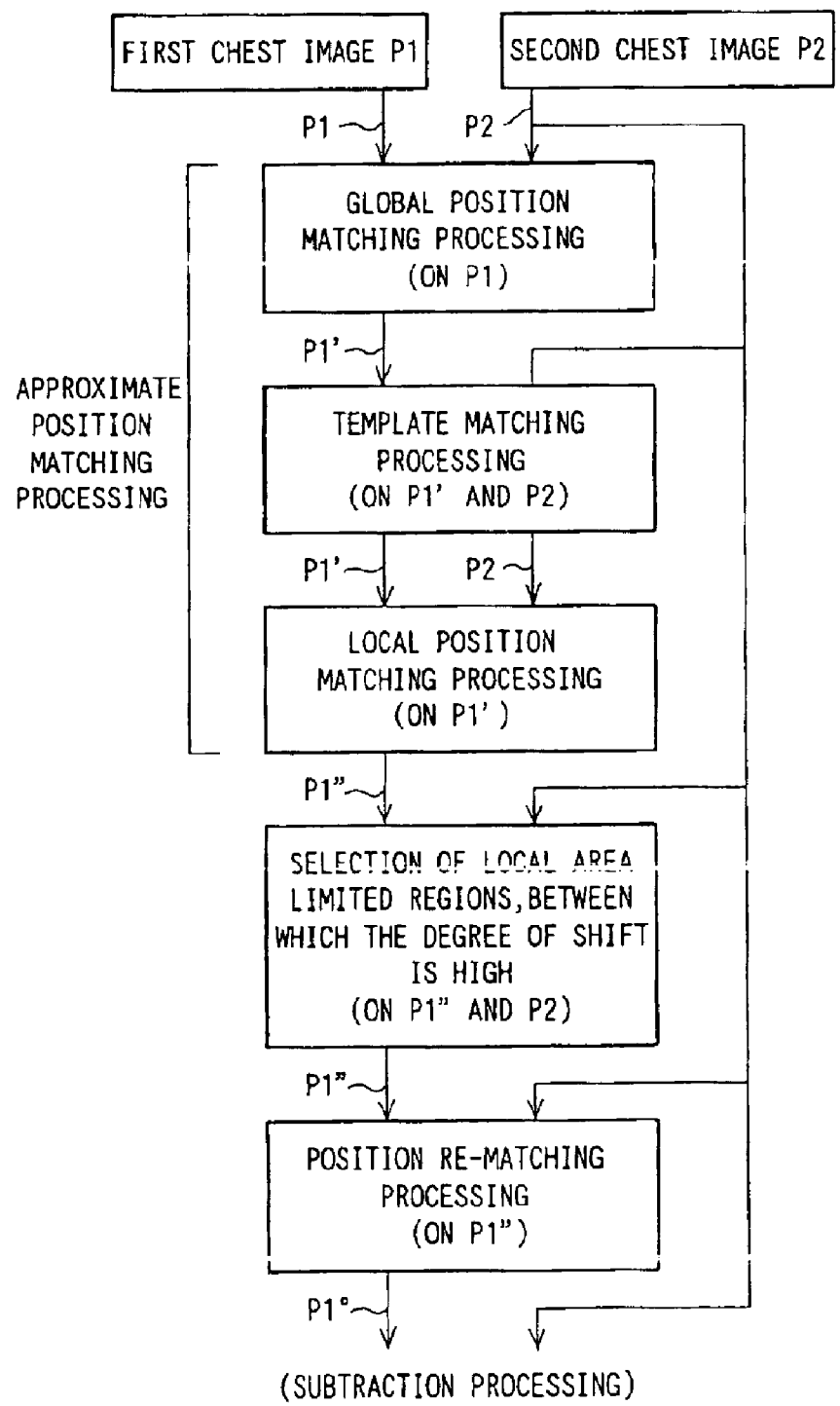
FIG. 1 is a flow chart showing a processing flow in an embodiment of the method of matching positions of images in accordance with the present invention.
Figure 2:
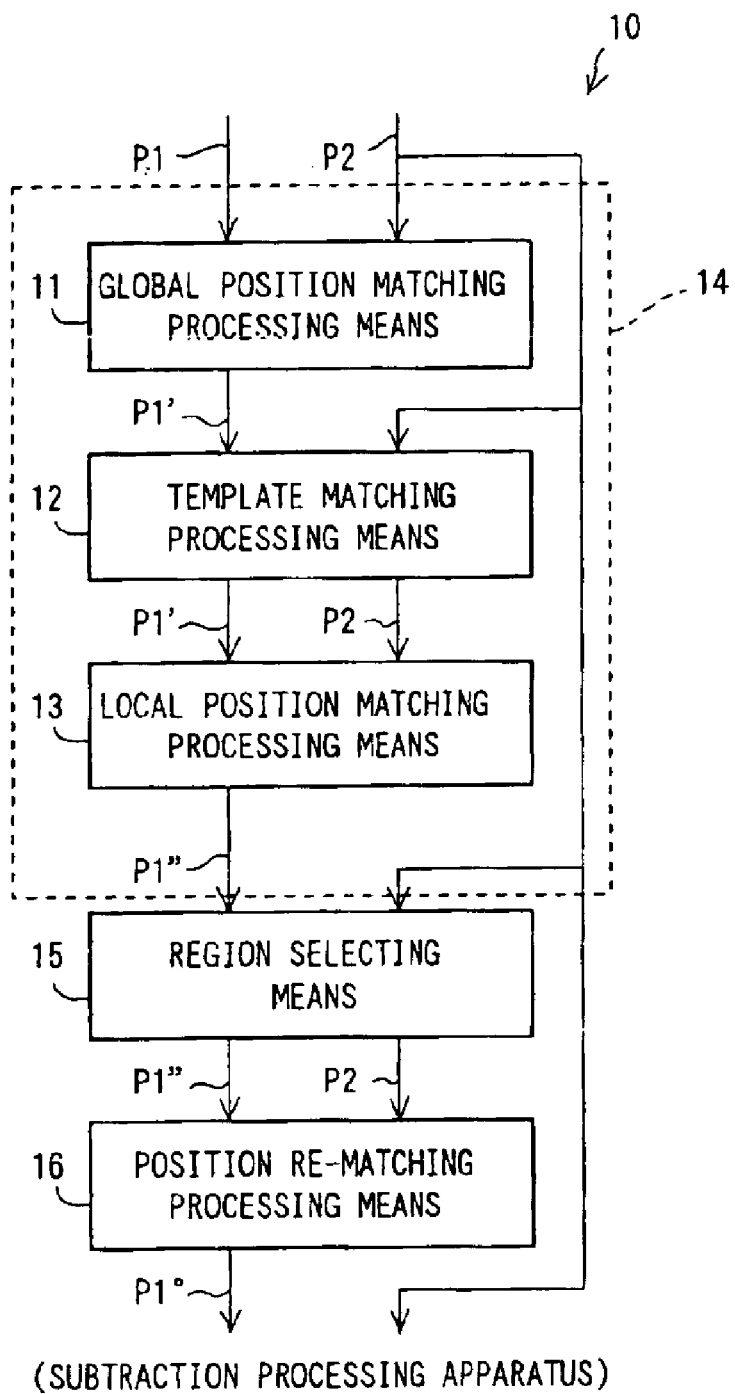
FIG. 2 is a block diagram showing a first embodiment of the apparatus for matching positions of images in accordance with the present invention, which carries out the processing flow shown in FIG. 1, FIGS. 3A and 3B are schematic views showing two images P1 and P2, whose positions are to be matched with each other by the embodiment of FIG. 2, FIGS. 4A and 4B are explanatory views showing how global position matching processing is performed.
Figure 3A:
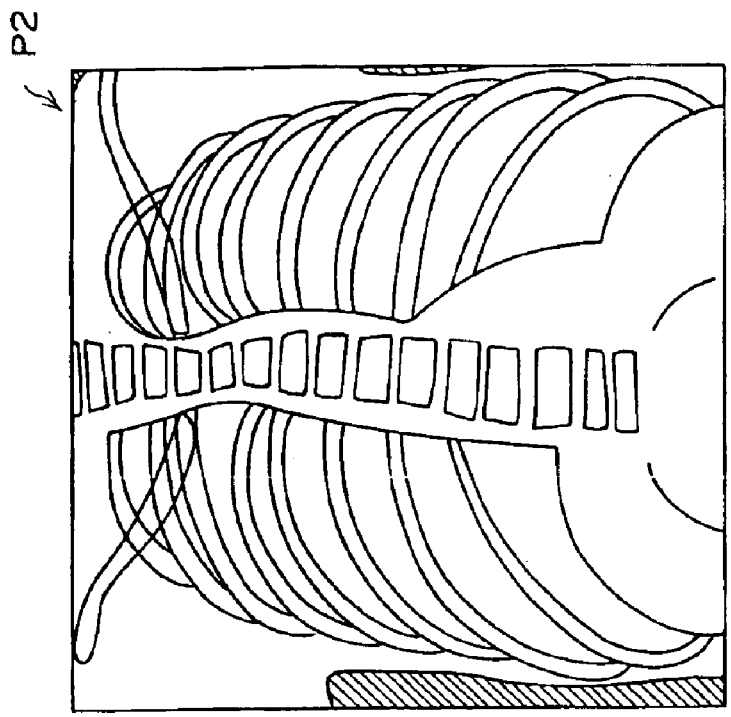
Figure 3B:
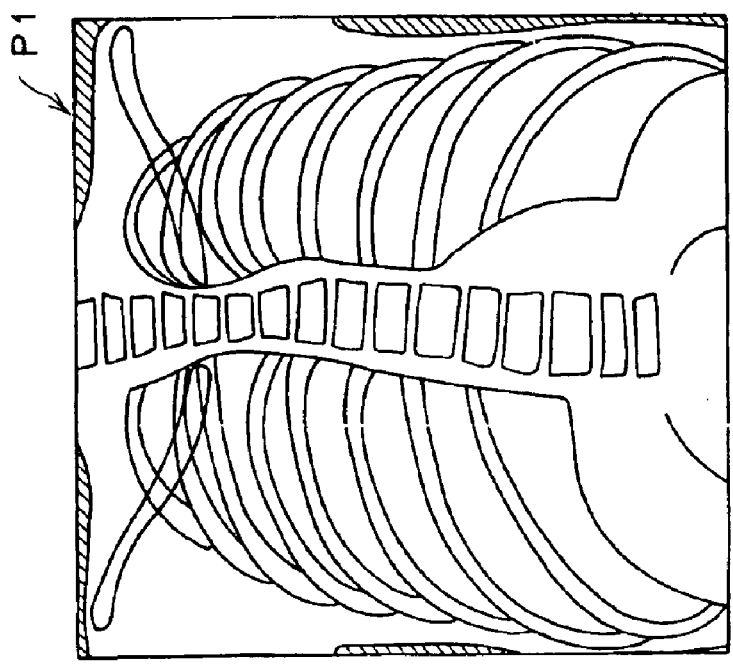

FIG. 1 is a flow chart showing a processing flow in an embodiment of the method of matching positions of images in accordance with the present invention. FIG. 2 is a block diagram showing a first embodiment of the apparatus for matching positions of images in accordance with the present invention, which carries out the processing flow shown in FIG. 1. FIGS. 3A and 3B are schematic views showing two images P1 and P2, whose positions are to be matched with each other by the embodiment of FIG. 2. A first image P1 and a second image P2 are chest images (radiation images) of a single same patient, which images have been recorded at different points of time. The first image P1 is a past image, which has been recorded at a point of time earlier than the recording of the second image P2. The second image P2 is a current image, which is newer than the first image P1. The first image P1 and the second image P2 are the images to be subjected to temporal subtraction processing, wherein a subtraction process is performed on corresponding pixels in the two images, and a temporal subtraction image is thereby acquired.

In cases where the two images P1 and P2 are compared with each other, ordinarily, the person who sees the images, such as a medical doctor, makes a comparison by taking the second image P2, which is the current image, as a reference image. Therefore, in this embodiment of the apparatus for matching positions of images in accordance with the present invention, the second image P2 is taken as the reference image. However, alternatively, the first image P1 may be taken as the reference image, and the first image P1 and the second image P2 may be replaced by each other in the explanations described below.

With reference to FIG. 2, an image position matching apparatus 10 comprises approximate position matching processing means 14 for performing approximate position matching processing with respect to entire areas of the two images P1 and P2 of the single same object. The image position matching apparatus 10 also comprises region selecting means 15 for selecting local area limited regions, between which the degree of shift is high, in an image P1" (an image having been obtained by processing the first image P1 for the approximate position matching processing) and the second image P2, whose positions have been approximately matched with each other by the approximate position matching processing. The image position matching apparatus 10 further comprises position re-matching processing means 16 for performing position re-matching processing with respect to the local area limited regions, which have been selected by the region selecting means 15, and regions neighboring with the local area limited regions.

The approximate position matching processing means 14 comprises global position matching processing means 11, which performs global position matching processing on the two images P1 and P2 by performing an affine transform, such as rotating processing, parallel translation, and image size enlargement or reduction processing, on the entire area of the first image P1, which has been acquired at a point of time earlier than the second image P2. The approximate position matching processing means 14 also comprises template matching processing means 12. The template matching processing means 12 sets a plurality of template regions T, T, . . . , which are rectangular small regions, in the second image P2, which is the current image acting as the reference image. Specifically, of an image P1' (an image having been obtained by performing the processing, i.e., the affine transform, on the first image P1 for the global position matching processing) and the second image P2, whose positions have been matched with each other by the global position matching processing, the second image P2 is taken as the reference image. The template matching processing means 12 also sets a plurality of search regions R, R, . . . , each of which corresponds to one of the template regions T, T, . . . and is larger than each of the template regions T, T, . . . , in the first image P1' having been obtained from the affine transform. The template matching processing means 12 further determines subregions T', T', . . . in the respective search regions R, R, . . . , in each of which subregions the image pattern approximately coincides with the image pattern within the corresponding template region T. Furthermore, the template matching processing means 12 calculates corresponding position relationships between the subregions T', T', . . . and the corresponding template regions T, T. . . . . The approximate position matching processing means 14 further comprises local position matching processing means 13, which performs local position matching processing in local area limited units with respect to the entire areas of the first image P1' and the second image P2 by performing a nonlinear transform (e.g., nonlinear strain transform, i.e. warping, which is curve fitting utilizing two-dimensional polynomials of the tenth order) on the entire area of the first image P1' and in accordance with the corresponding position relationships between the subregions T', T', . . . and the corresponding template regions T, T, . . . , the corresponding position relationships having been obtained from the template matching processing means 12, such that the subregions T', T', . . . in the first image P1' approximately coincide with the corresponding template regions T, T, . . . in the second image P2.

Figure 8:
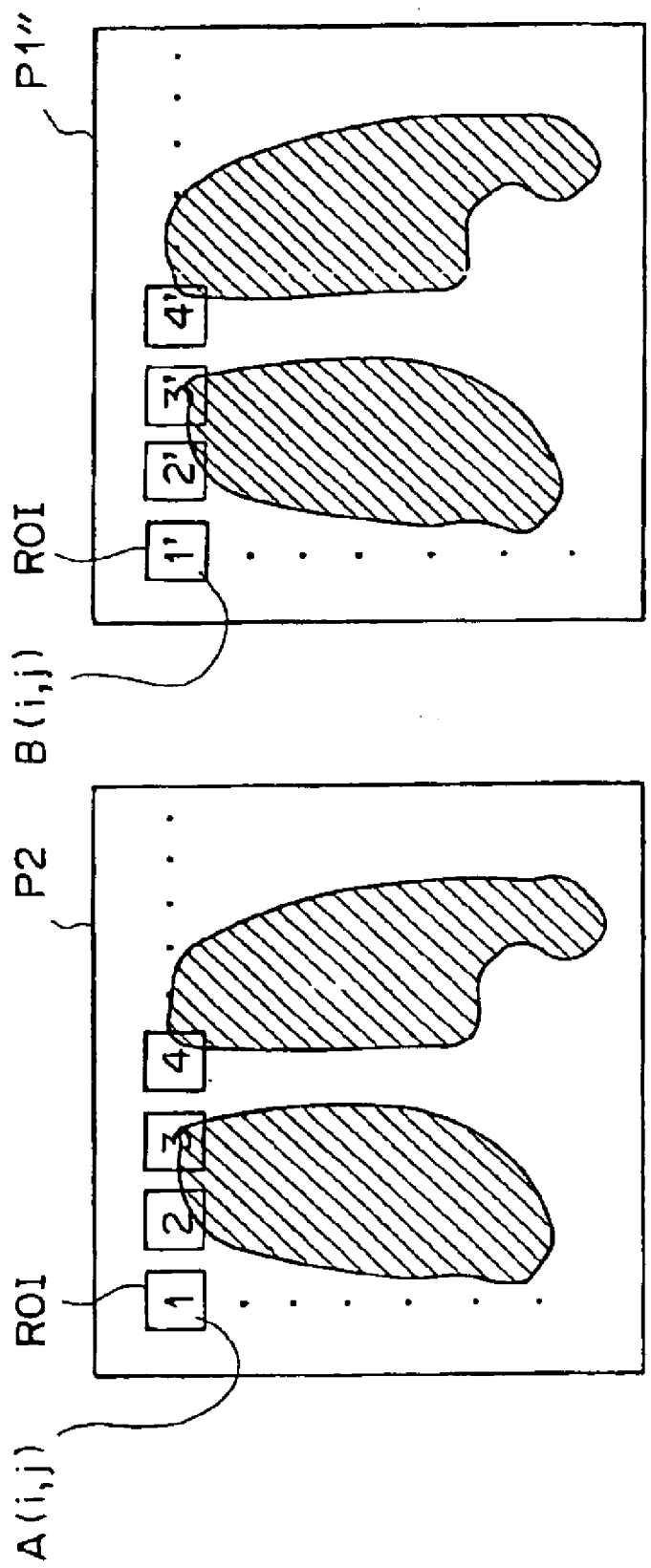
FIGS. 8A and 8B are explanatory views showing local area limited regions, which are set for the selection of the regions to be subjected to the position re-matching processing.

As illustrated in FIGS. 8A and 8B, the region selecting means 15 sets a plurality of regions of interest (ROI's) on each of the first image P1" and the second image P2, whose positions have been approximately matched with each other by the approximate position matching processing. The ROI's have their center points at corresponding spatial coordinates on the first image P1" and the second image P2 and have an identical shape, e.g. a rectangular shape having a size of 16 pixels (in the vertical direction)×16 pixels (in the horizontal direction). Specifically, ROI1, ROI2, ROI3, . . . are set in the second image P2, and ROI1', ROI2', ROI3', . . . are set in the first image P1". Also, with respect to each of sets of the corresponding ROI's (e.g., a set of ROI1 and ROI1', a set of ROI2 and ROI2', and so on) in the second image P2 and the first image P1", the region selecting means 15 calculates a total sum value Ds of absolute values of pixel value differences between corresponding pixels (i.e., the pixels having identical spatial coordinates) in the corresponding ROI's as an index representing the degree of shift between the corresponding ROI's. Specifically, as the index representing the degree of shift between the corresponding ROI's, the region selecting means 15 calculates the total sum value Ds [$=\Sigma\Sigma|A(i, j)-B(i, j)|$] of the absolute values of the differences [$=|A(i, j)-B(i, j)|$] between the pixel values of the corresponding pixels [a pixel value $A(i, j)$ of the pixel within the ROI in the second image P2 and a pixel value $B(i, j)$ of the corresponding pixel within the corresponding ROI in the first image P1" after being transformed]. Also, the region selecting means 15 compares the thus obtained total sum value Ds with a threshold value K having been set previously. The region selecting means 15 selects the corresponding ROI's, which are associated with the total sum value Ds larger than the threshold value K (Ds>K), as the local area limited regions, between which the degree of shift is high, and which are to be subjected to the position re-matching processing. Also, the region selecting means 15 regards the corresponding ROI's, which are associated with the total sum value Ds not larger than the threshold value K (Ds≦K), as the local area limited regions, between which the degree of shift is low, and which are not to be subjected to the position re-matching processing.

Figure 9:
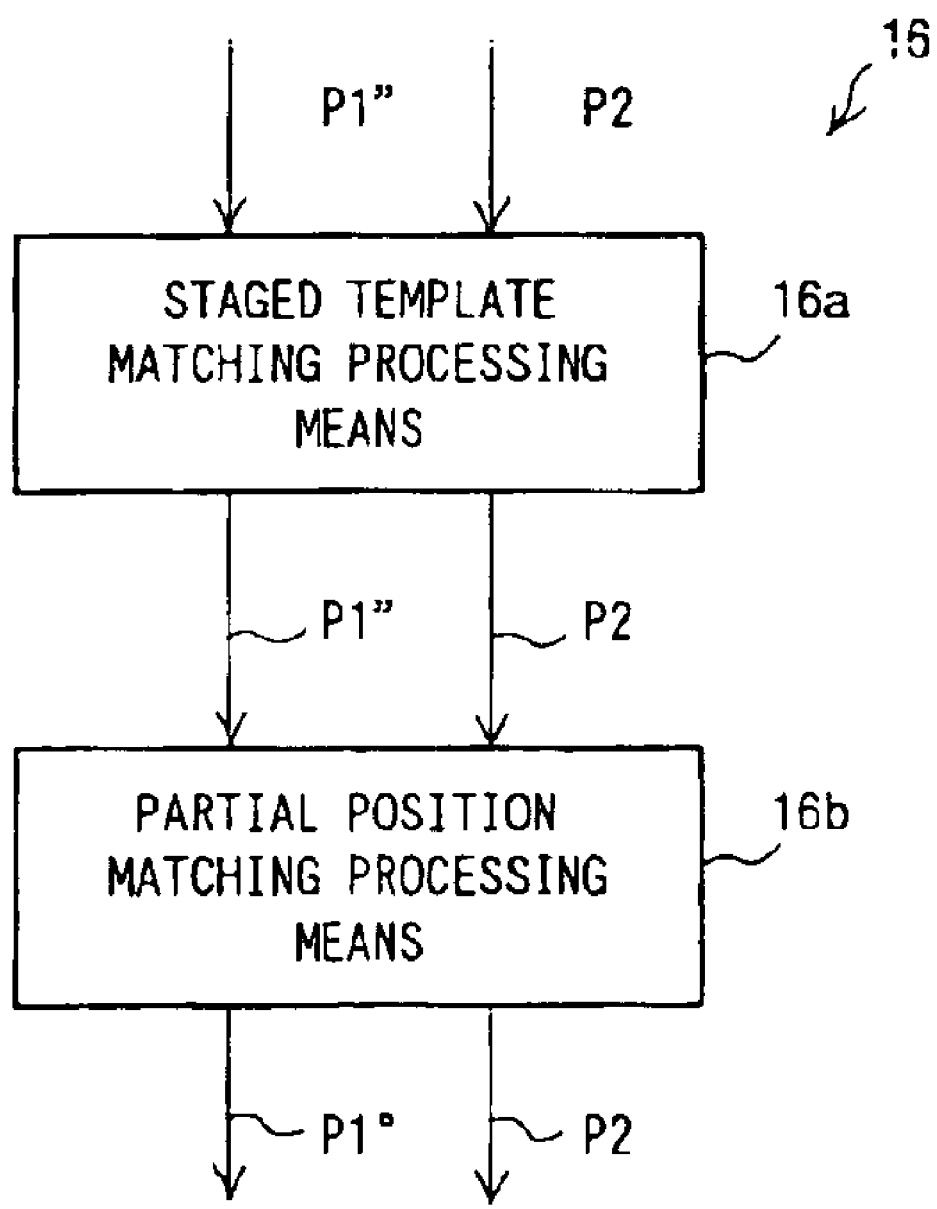
FIG. 9 is a block diagram showing position re-matching processing means.

As illustrated in FIG. 9, the position re-matching processing means 16 comprises staged template matching processing means 16a and partial position matching processing means 16b. The staged template matching processing means 16a sets a template region (i.e., a template ROI) in one of the corresponding ROI's, between which the degree of shift is high, and which have been selected by the region selecting means 15. The staged template matching processing means 16a also sets a search region (i.e., a search ROI) in the other ROI. The setting of the template region and the search region is performed with respect to each of the sets of the corresponding ROI's, between which the degree of shift is high. Further, the staged template matching processing means 16a determines a subregion within the search region, in which subregion the degree of image pattern coincidence with the corresponding template ROI is high. Furthermore, the staged template matching processing means 16a calculates a corresponding position relationship (i.e., a shift quantity) between the template region and the corresponding subregion. Thereafter, the staged template matching processing means 16a iterates operations, in which the sizes of the template region and the search region are reduced in stages, the template region and the search region having the sizes reduced in stages are set in accordance with the corresponding position relationship having been calculated in the preceding stage, and a corresponding position relationship between the template region and the corresponding subregion is calculated successively. In this manner, the staged template matching processing means 16a calculates an ultimate corresponding position relationship with respect to each of the sets of the corresponding ROI's, between which the degree of shift is high. (In this embodiment, an accumulated corresponding position relationship, which is obtained by accumulating the corresponding position relationships, i.e. the shift quantities, at the respective stages, is employed as the ultimate corresponding position relationship.) In accordance with the ultimate corresponding position relationships, which have been calculated ultimately by the staged template matching processing means 16a and with respect to the sets of the corresponding ROI's, between which the degree of shift is high, the partial position matching processing means 16b performs transform processing for the position matching on the local area limited region in the first image P1", which local area limited region has been selected, and regions neighboring with the local area limited region, such that the corresponding local area limited regions, between which the degree of shift is high, in the first image P1" and the second image P2, whose positions have been approximately matched with each other by the approximate position matching processing, approximately coincide with each other.

Figure 10:
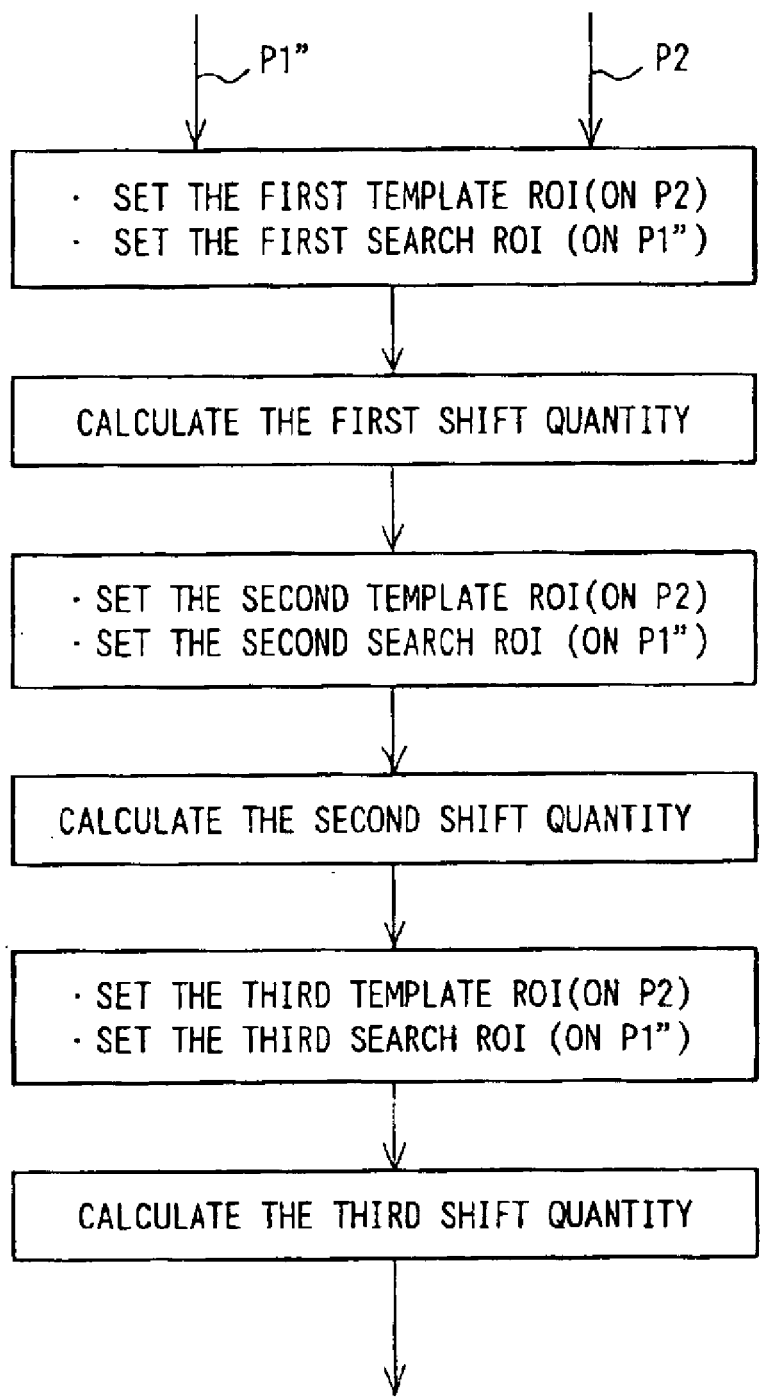
FIG. 10 is a flow chart showing the position re-matching processing.

Specifically, as illustrated in FIG. 10, the staged template matching processing means 16*a* performs the processing described below.

(1) As for the second image P2 acting as the reference image, with respect to each ROI in the second image P2, the staged template matching processing means 16*a* sets a first template region TR (one of TR1, TR2, . . . ), which has its center point at a center point having coordinates (x0, y0) in the ROI. By way of example, the first template region TR may have a rectangular shape having a size of 80 pixels (in the vertical direction)×80 pixels (in the horizontal direction). Also, as for the first image P1", with respect to each ROI in the first image P1", the staged template matching processing means 16*a* sets a first search region RR (one of RR1, RR2, . . . ), which has its center point at the same coordinates (x0, y0) as the coordinates of the center point of the first template region TR and is larger than the first template region TR. By way of example, the first search region RR may have a rectangular shape having a size of 92 pixels (in the vertical direction)×92 pixels (in the horizontal direction). Further, with respect to each of the sets of the first template regions TR, TR, . . . and the corresponding first search regions RR, RR, . . . (a set of TR1 and RR1, a set of TR2 and RR2, and soon), the staged template matching processing means 16*a* determines a first subregion tR within the first search region RR, in which first subregion the degree of image pattern coincidence with the corresponding first template region TR is high. (At this time, as an index representing the degree of image pattern coincidence, for example, a normalized cross correlation value may be employed.) Furthermore, the staged template matching processing means 16*a* calculates a first position relationship, which is the corresponding position relationship between the first template region TR and the first subregion tR. In accordance with the first position relationship, the staged template matching processing means 16*a* calculates a first shift quantity ($+\Delta x, +\Delta y$), which is a translation quantity for causing the first template region TR to coincide with the first subregion tR.

(2) Thereafter, as for the second image P2, in accordance with the first shift quantity ($+\Delta x, +\Delta y$), the staged template matching processing means 16*a* sets a second template region TR' (one of TR'1, TR'2, . . . ), which has its center point at the original center point having the coordinates (x0, y0). By way of example, the second template region TR' may have a rectangular shape having a size of 48 pixels (in the vertical direction)×48 pixels (in the horizontal direction). Also, as for the first image P1", the staged template matching processing means 16*a* sets a second search region RR' (one of RR'1, RR'2, . . . ) having its center point at a position having coordinates (x', y') [=(x0+$\Delta x$, y0+$\Delta y$)], which position has been translated by the first shift quantity ($+\Delta x, +\Delta y$) from the center point having the coordinates (x0, y0) in the first subregion tR. The second search region RR' is larger than the second template region TR' and is smaller than the first search region RR. By way of example, the second search region RR' may have a rectangular shape having a size of 56 pixels (in the vertical direction)×56 pixels (in the horizontal direction). Further, with respect to each of the sets of the second template regions TR', TR', . . . and the corresponding second search regions RR', RR', . . . (a set of TR'1 and RR'1, a set of TR'2 and RR'2, and so on), the staged template matching processing means 16*a* determines a second subregion tR' within the second search region RR', in which second subregion the degree of image pattern coincidence with the corresponding second template region TR' is high. (At this time, as an index representing the degree of image pattern coincidence, for example, the total sum of the absolute values of the differences between pixel values may be employed.) Furthermore, the staged template matching processing means 16*a* calculates a second position relationship, which is the corresponding position relationship between the second template region TR' and the second subregion tR'. In accordance with the second position relationship, the staged template matching processing means 16*a* calculates a second shift quantity ($+\Delta x', +\Delta y'$), which is a translation quantity for causing the second template region TR' to coincide with the second subregion tR'.

(3) Thereafter, as for the second image P2, in accordance with the second shift quantity ($+\Delta x', +\Delta y'$), the staged template matching processing means 16*a* sets a third template region TR" (one of TR"1, TR"2, . . . ), which has its center point at the original center point having the coordinates (x0, y0). By way of example, the third template region TR" may have a rectangular shape having a size of 16 pixels (in the vertical direction)×16 pixels (in the horizontal direction). Also, as for the first image P1", the staged template matching processing means 16*a* sets a third search region RR" (one of RR"1, RR"2, . . . ) having its center point at a position having coordinates (x", y") [=(x'+$\Delta x'$, y'+$\Delta y'$)= (x0+$\Delta x$+$\Delta x'$, y0+$\Delta y$+$\Delta y'$)], which position has been translated by the second shift quantity ($+\Delta x', +\Delta y'$) from the center point having the coordinates (x', y') in the second subregion tR'. The third search region RR" is larger than the third template region TR" and is smaller than the second search region RR'. By way of example, the third search region RR" may have a rectangular shape having a size of 20 pixels (in the vertical direction)×20 pixels (in the horizontal direction). Further, with respect to each of the sets of the third template regions TR", TR", . . . and the corresponding third search regions RR", RR", . . . (a set of TR"1 and RR"1, a set of TR"2 and RR"2, and so on), the staged template matching processing means 16*a* determines a third subregion tR" within the third search region RR", in which third subregion the degree of image pattern coincidence with the corresponding third template region TR" is high. (At this time, as an index representing the degree of image pattern coincidence, for example, the total sum of the absolute values of the differences between pixel values may be employed.) Furthermore, the staged template matching processing means 16*a* calculates a third position relationship, which is the corresponding position relationship between the third template region TR" and the third subregion tR". In accordance with the third position relationship, the staged template matching processing means 16*a* calculates a third shift quantity ($+\Delta x'', +\Delta y''$), which is a translation quantity for causing the third template region TR" to coincide with the third subregion tR".

(4) Thereafter, with respect to the center point of each ROI (each of ROI1, ROI2, . . . ), the staged template matching processing means 16*a* calculates an ultimate translation quantity (i.e., an ultimate shift quantity), ($+\Delta x_i, +\Delta y_i$) where i=1, 2, . . . [=first shift quantity+second shift quantity+ third shift quantity].

Also, in accordance with the translation quantities ($+\Delta x_i$, $+\Delta y_i$) of the center points of the respective ROI's in the second image P2, the staged template matching processing means 16a calculates the translation quantities of all of the pixels in each ROI in the second image P2 by performing, for example, interpolating operations (linear interpolation, spline interpolation, Bezier interpolation, or the like) utilizing the translation quantities of four neighboring points (the center points of the respective ROI's).

The partial position matching processing means 16b performs warping on only the ROI in the first image P" and regions neighboring with the ROI and in accordance with the translation quantities of the pixels in the second image P2, which translation quantities have been calculated by the staged template matching processing means 16a. In this manner, the partial position matching processing means 16b performs the matching of positions of the first image P1" and the second image P2. Since the template region and the search region are set with respect to only the ROI's, between which the degree of shift is high, the shift quantity $(+\Delta xi, +\Delta yi)$ between the ultimate corresponding positions of the center points of the ROI's, between which the degree of shift is low, (i.e., the ROI's which need not be subjected to the position re-matching processing) may be uniformly set to be (0, 0). In this manner, the shift quantities of the center points of all of the ROI's in the second image P2 maybe set. Also, in accordance with the thus set shift quantities, the shift quantities of the pixels in the ROI's and the neighboring regions in the second image P2 may be calculated with the interpolating operations utilizing the shift quantities of the four neighboring points (the center points of the ROI's), which interpolating operations will be described later.

How the image position matching apparatus 10 operates will be described hereinbelow.

Figure 4B:
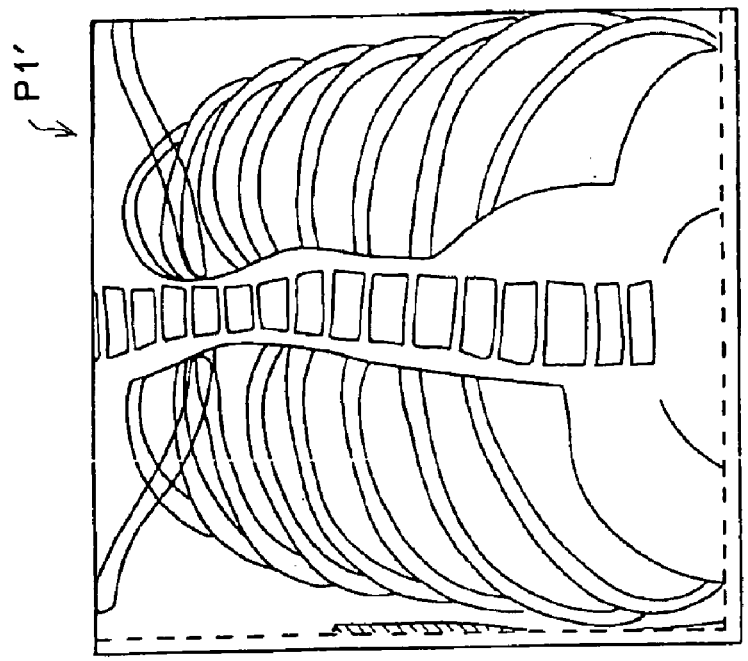
Figure 4A:
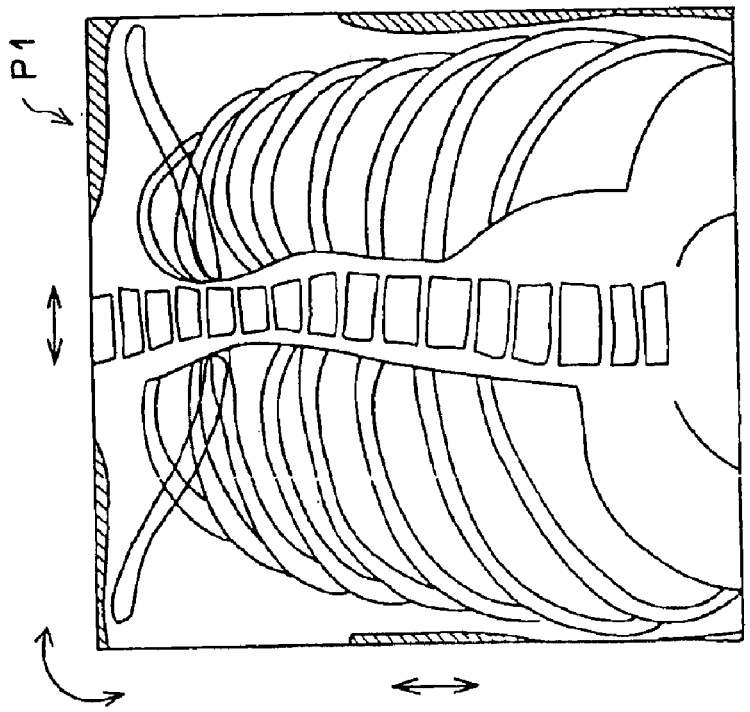

Firstly, image signals representing the first image P1 and the second image P2 shown in FIGS. 3A and 3B, which have been acquired in the time series manner, are fed into the global position matching processing means 11 of the approximate position matching processing means 14. As illustrated in FIGS. 4A and 4B, with respect to the two received images P1 and P2, the global position matching processing means 11 takes the currently acquired second image P2 as the reference image and performs the affine transform on the first image P1. In this manner, the global position matching processing means 11 matches the position of the first image P1 with the position of the second image P2 in the global manner.

Figure 5A:
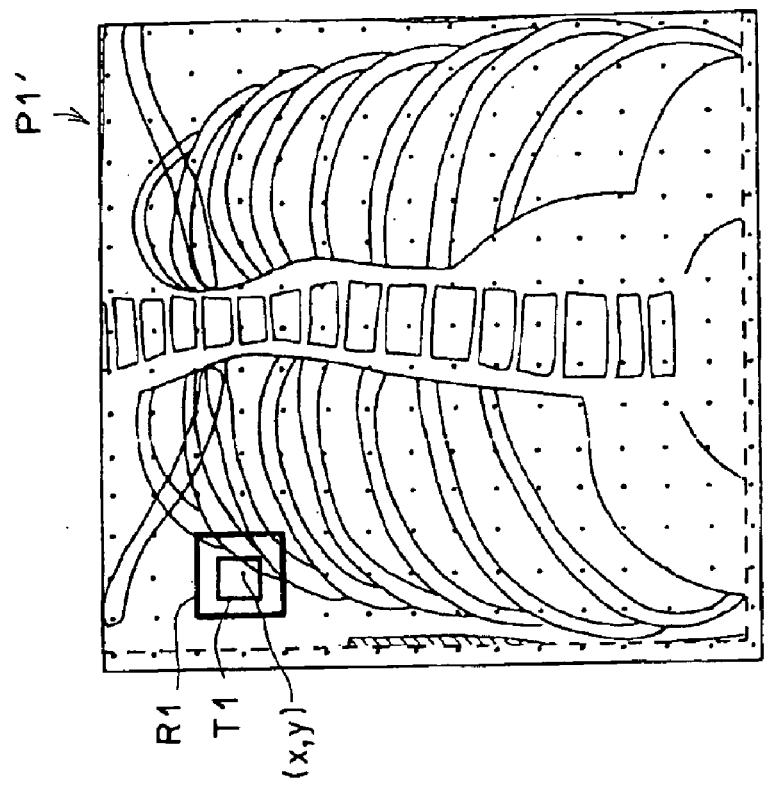
FIGS. 5A and 5B are explanatory views showing how local position matching processing is performed.
Figure 5B:
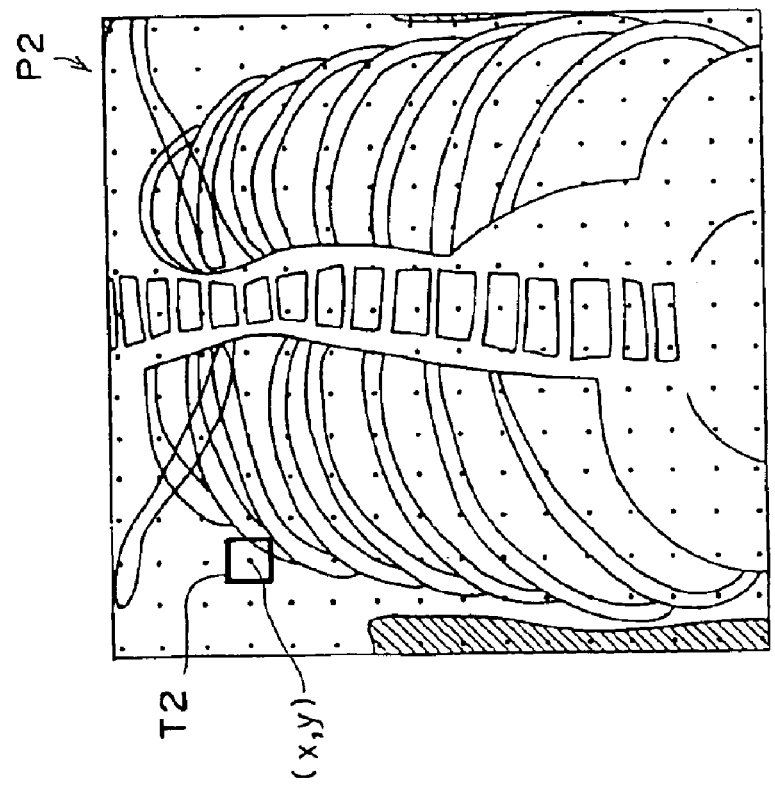

Thereafter, as illustrated in FIG. 5A, the template matching processing means 12 sets a plurality of template regions T2, T2, . . . , which are rectangular small regions, in the second image P2, which is the current image acting as the reference image. Specifically, of the image P1' (the image having been obtained by performing the affine transform on the first image P1 for the global position matching processing) and the second image P2, whose positions have been matched with each other by the global position matching processing, the second image P2 is taken as the reference image. Also, as illustrated in FIG. 5B, the template matching processing means 12 sets a plurality of search regions R1, R1, . . . , each of which corresponds to one of the template regions T2, T2, . . . in the second image P2 and is larger than each of the template regions T, T, . . . , in the first image P1'. The template matching processing means 12 further determines subregions T1, T1, . . . in the respective search regions R1, R1, . . . , in each of which subregions the image pattern approximately coincides with the image pattern within the corresponding template region T in the second image P2. Furthermore, the template matching processing means 12 calculates corresponding position relationships (i.e., the shift quantities) between the subregions T1, T1, . . . in the first image P1' and the corresponding template regions T2, T2, . . . in the second image P2.

Figure 6:
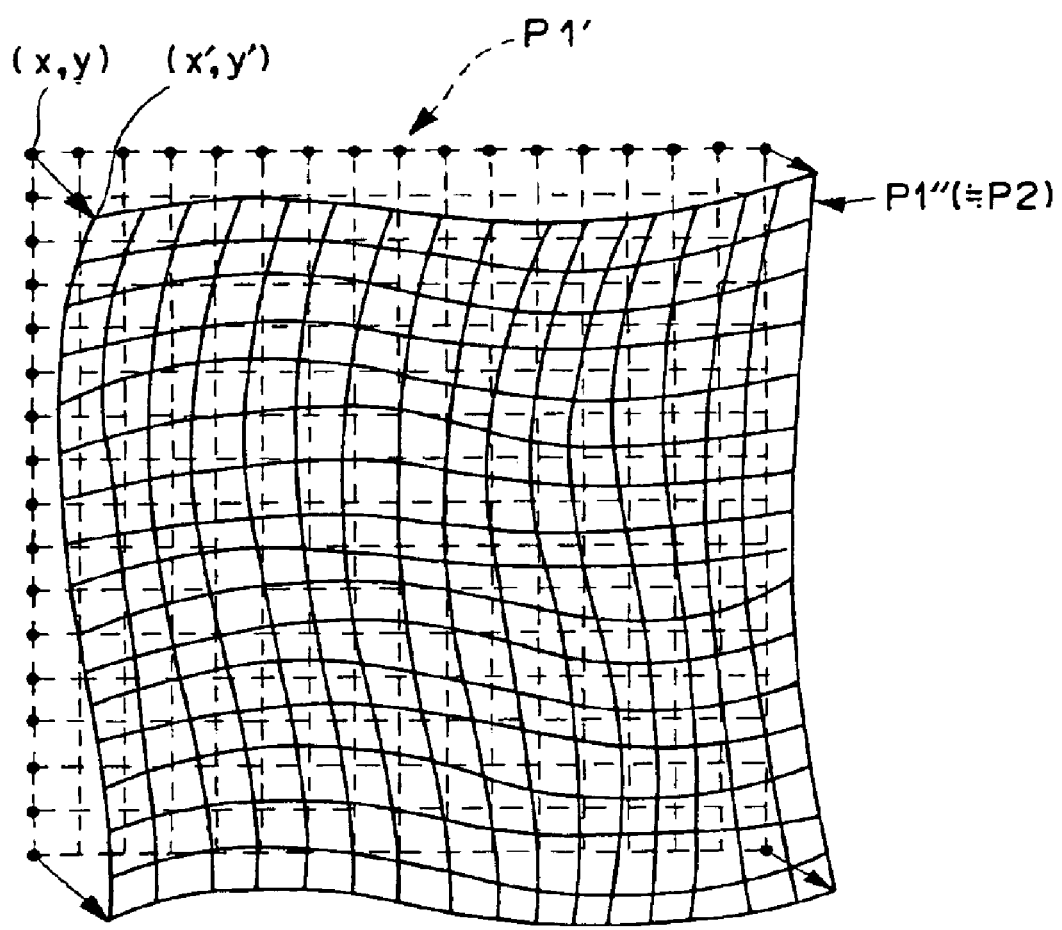
FIG. 6 is an explanatory view showing how nonlinear strain transform processing is performed.

Thereafter, as illustrated in FIG. 6, the local position matching processing means 13 performs the nonlinear strain transform processing on the entire area of the first image P1', which has been obtained from the affine transform, and in accordance with the corresponding position relationships between the subregions T1, T1, . . . and the corresponding template regions T2, T2, . . . , which corresponding position relationships have been obtained from the template matching processing means 12. The nonlinear strain transform processing is performed such that the subregions T1, T1, . . . in the first image P1' approximately coincide with the corresponding template regions T2, T2, . . . in the second image P2. From the nonlinear strain transform processing performed on the first image P1' having been obtained from the affine transform, the first image P1" is obtained. The position of the first image P1" has thus been matched with the position of the second image P2 in the local manner.

With the approximate position matching processing described above, the positions of the first image P1" and the second image P2 as a whole are matched with each other with a certain level of accuracy. However, even after the approximate position matching processing has been performed, a shift often remains between certain local area limited regions.

Therefore, in the image position matching apparatus 10, with respect to the first image P1" and the second image P2, whose positions have been approximately matched with each other by the approximate position matching processing, the region selecting means 15 performs the processing for selecting the local area limited regions, between which the degree of shift is still high. Also, the position re-matching processing means 16 performs the position re-matching processing on the local area limited regions, which have thus been selected by the region selecting means 15.

Figure 7:
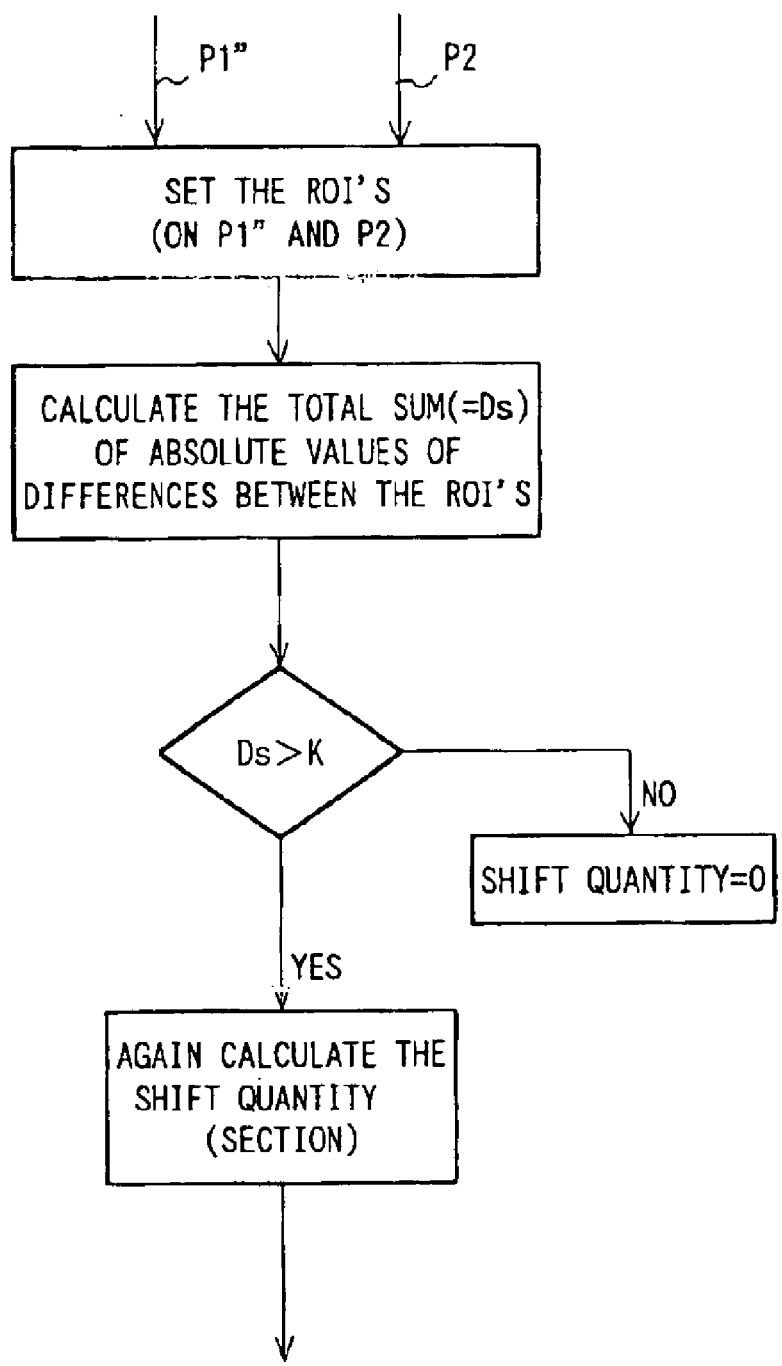
FIG. 7 is a flowchart showing processing for selecting regions, which are to be subjected to position re-matching processing.

Specifically, the image signals representing the first image P1" and the second image P2, whose positions have been approximately matched with each other by the approximate position matching processing, are fed into the region selecting means 15. As illustrated in FIG. 7 and FIGS. 8A and 8B, the region selecting means 15 sets the plurality of the ROI's in each of the first image P1" and the second image P2. The ROI's have their center points at the corresponding spatial coordinates on the first image P1" and the second image P2 and have the identical shape. Specifically, ROI1, ROI2, ROI3, . . . are set in the second image P2, and ROI1', ROI2', ROI3', . . . are set in the first image P1". Also, with respect to each of the sets of the corresponding ROI's (e.g., the set of ROI1 and ROI1', the set of ROI2 and ROI2', and so on) in the second image P2 and the first image P1", the region selecting means 15 calculates the total sum value Ds of the absolute values of the pixel value differences between the corresponding pixels (i.e., the pixels having the identical spatial coordinates) in the corresponding ROI's as the index representing the degree of shift between the corresponding ROI's. Specifically, as the index representing the degree of shift between the corresponding ROI's, the region selecting means 15 calculates the total sum value Ds $[=\Sigma\Sigma|A(i,j)-B(i,j)|]$ of the absolute values of the differences $[=|A(i,j)-B(i,j)|]$ between the pixel values of the corresponding pixels [the pixel value $A(i,j)$ of the pixel within the ROI in the second image P2 and the pixel value $B(i,j)$ of the corresponding pixel within the corresponding ROI in the first image P1" after being transformed].

Also, the region selecting means 15 compares the thus obtained total sum value Ds with the threshold value K having been set previously. The region selecting means 15 selects the corresponding ROI's, which are associated with the total sum value Ds larger than the threshold value K (Ds>K), as the local area limited regions, between which the degree of shift is high, and which are to be subjected to the position re-matching processing. Also, the region selecting means 15 regards the corresponding ROI's, which are associated with the total sum value Ds not larger than the threshold value K (Ds≦K), as the local area limited regions, between which the degree of shift is low, and which are not to be subjected to the position re-matching processing. More specifically, as for the local area limited regions, which are not to be subjected to the position re-matching processing, the ultimate corresponding position relationship (i.e., the shift quantity) between the center points of the local area limited regions, which are not to be subjected to the position re-matching processing, is set to be 0 (zero) in the position re-matching processing. In the strict sense, the pixels other than the pixels at the center points of the local area limited regions, which are not to be subjected to the position re-matching processing, may be subjected to the calculation of the corresponding position relationship (i.e., the shift quantity) and the transform processing in the position re-matching processing.

Thereafter, as illustrated in FIG. 10, the staged template matching processing means 16a performs the processing described below on the received first image P1" and the second image P2. Specifically, as for the second image P2 acting as the reference image, with respect to each ROI in the second image P2, the staged template matching processing means 16a sets the first template region TR (one of TR1, TR2, . . . ), which has its center point at the center point having the coordinates (x0, y0) in the ROI. By way of example, the first template region TR may have a rectangular shape having a size of 80 pixels (in the vertical direction)×80 pixels (in the horizontal direction). Also, as for the first image P1", with respect to each ROI in the first image P1", the staged template matching processing means 16a sets the first search region RR (one of RR1, RR2, . . . ), which has its center point at the same coordinates (x0, y0) as the coordinates of the center point of the first template region TR and is larger than the first template region TR. By way of example, the first search region RR may have a rectangular shape having a size of 92 pixels (in the vertical direction)×92 pixels (in the horizontal direction). Further, with respect to each of the sets of the first template regions TR, TR, . . . and the corresponding first search regions RR, RR, . . . , the staged template matching processing means 16a determines the first subregion tR within the first search region RR, in which first subregion the degree of image pattern coincidence with the corresponding first template region TR is high. (At this time, as the index representing the degree of image pattern coincidence, for example, the normalized cross correlation value may be employed.) A judgment as to whether the degree of image pattern coincidence is high or low may be made by comparison with a predetermined threshold value. Furthermore, the staged template matching processing means 16a calculates the first position relationship, which is the corresponding position relationship between the first template region TR and the first subregion tR. In accordance with the first position relationship, the staged template matching processing means 16a calculates the first shift quantity (+Δx, +Δy), which is the translation quantity for causing the first template region TR to coincide with the first subregion tR.

Figure 11A:
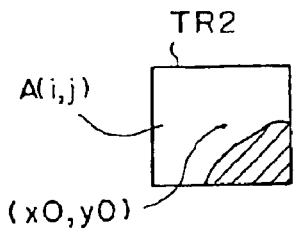
FIGS. 11A and 11B are explanatory views showing correspondence relationships among a first template region TR2, a first search region RR2, and a first subregion tR2.
Figure 11B:
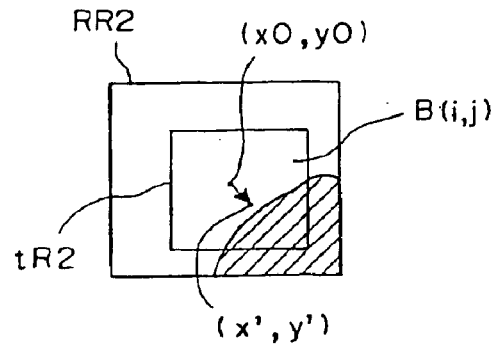

For example, as illustrated in FIGS. 11A and 11B, the image pattern within a first template region TR2 shown in FIG. 11A, which has its center point at the coordinates (x0, y0), is searched within the corresponding first search region RR2 shown in FIG. 11B, which has its center point at the coordinates (x0, y0). As a result, a first subregion tR2 having its center point at the coordinates (x', y') may be detected as the first subregion tR, in which the degree of image pattern coincidence with the first template region TR2 is the highest. In such cases, the first shift quantity (+Δx, +Δy) maybe calculated with the formula shown below.

$$(+\Delta x, +\Delta y) = (x'-x0, y'-y0)$$

Thereafter, as for the second image P2, the staged template matching processing means 16a sets the second template region TR' (one of TR'1, TR'2, . . . ), which has its center point at the original center point having the coordinates (x0, y0) and is smaller than the first template region TR. By way of example, the second template region TR' may have a rectangular shape having a size of 48 pixels (in the vertical direction)×48 pixels (in the horizontal direction). Also, as for the first image P1", the staged template matching processing means 16a sets the second search region RR' (one of RR'1, RR'2, . . . ) having its center point at the position having coordinates (x', y') [=(x0+Δx, y0+Δy)], which position has been translated by the first shift quantity (+Δx, +Δy) from the center point having the coordinates (x0, y0) in the first subregion tR. The second search region RR' is larger than the second template region TR' and is smaller than the first search region RR. By way of example, the second search region RR' may have a rectangular shape having a size of 56 pixels (in the vertical direction)×56 pixels (in the horizontal direction). Further, with respect to each of the sets of the second template regions TR', TR', . . . and the corresponding second search regions RR', RR', . . . (the set of TR'1 and RR'1, the set of TR'2 and RR'2, and so on), the staged template matching processing means 16a determines the second subregion tR' within the second search region RR', in which second subregion the degree of image pattern coincidence with the corresponding second template region TR' is high. (At this time, as the index representing the degree of image pattern coincidence, for example, the total sum of the absolute values of the differences between pixel values may be employed.) A judgment as to whether the degree of image pattern coincidence is high or low may be made by comparison with a predetermined threshold value. Furthermore, the staged template matching processing means 16a calculates the second position relationship, which is the corresponding position relationship between the second template region TR' and the second subregion tR'. In accordance with the second position relationship, the staged template matching processing means 16a calculates the second shift quantity (+Δx', +Δy'), which is the translation quantity for causing the second template region TR' to coincide with the second subregion tR'.

Figure 12A:
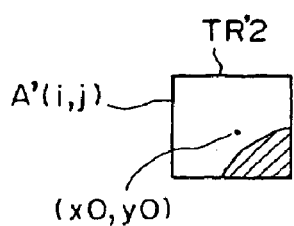
FIGS. 12A and 12B are explanatory views showing correspondence relationships among a second template region TR'2, a second search region RR'2, and a second subregion tR'2.
Figure 12B:
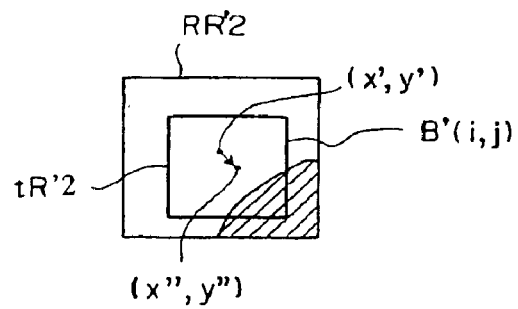

For example, as illustrated in FIGS. 12A and 12B, the image pattern within a second template region TR'2 shown in FIG. 12A, which has its center point at the coordinates (x0, y0), is searched within the corresponding second search region RR'2 shown in FIG. 12B, which has its center point at the coordinates (x', y'). As a result, a second subregion tR'2 having its center point at the coordinates (x", y") may be detected as the second subregion tR', in which the degree of image pattern coincidence with the second template region TR'2 is the highest. In such cases, the second shift quantity (+Δx', +Δy') may be calculated with the formula shown below.

$$(+\Delta x', +\Delta y') = (x'' - x', y'' - y')$$
$$= (x'' - x0 - \Delta x, y'' - y0 - \Delta y)$$

Thereafter, in the same manner as that described above, as for the second image P2, the staged template matching processing means 16a sets the third template region TR" (one of TR"1, TR"2, . . . ), which has its center point at the original center point having the coordinates (x0, y0) and is smaller than the second template region TR'. By way of example, the third template region TR" may have a rectangular shape having a size of 16 pixels (in the vertical direction)×16 pixels (in the horizontal direction). Also, as for the first image P1", the staged template matching processing means 16a sets the third search region RR" (one of RR"1, RR"2, . . . ) having its center point at the position having coordinates (x", y") [=(x'+Δx', y'+Δy')], which position has been translated by the second shift quantity (+Δx', +Δy') from the center point having the coordinates (x', y') in the second subregion tR'. The third search region RR" is larger than the third template region TR" and is smaller than the second search region RR'. By way of example, the third search region RR" may have a rectangular shape having a size of 20 pixels (in the vertical direction)×20 pixels (in the horizontal direction). Further, with respect to each of the sets of the third template regions TR", TR", . . . and the corresponding third search regions RR", RR", . . . (the set of TR"1 and RR"1, the set of TR"2 and RR"2, and so on), the staged template matching processing means 16a determines the third subregion tR" within the third search region RR", in which third subregion the degree of image pattern coincidence with the corresponding third template region TR" is high. (At this time, as the index representing the degree of image pattern coincidence, for example, the total sum of the absolute values of the differences between pixel values may be employed.) A judgment as to whether the degree of image pattern coincidence is high or low may be made by comparison with a predetermined threshold value. Furthermore, the staged template matching processing means 16a calculates the third position relationship, which is the corresponding position relationship between the third template region TR" and the third subregion tR". In accordance with the third position relationship, the staged template matching processing means 16a calculates the third shift quantity (+Δx", +Δy"), which is the translation quantity for causing the third template region TR" to coincide with the third subregion tR".

For example, the image pattern within a third template region TR"2, which has its center point at the coordinates (x0, y0), is searched within the corresponding third search region RR"2, which has its center point at the coordinates (x", y"). As a result, a third subregion tR"2 having its center point at coordinates (x°, y°) may be detected as the third subregion tR", in which the degree of image pattern coincidence with the third template region TR"2 is the highest. In such cases, the third shift quantity (+Δx", +Δy") may be calculated with the formula shown below.

$$(+\Delta x'', +\Delta y'') = (x° - x'', y° - y'')$$
$$= (x° - x0 - \Delta x - \Delta x', y° - y0 - \Delta y - \Delta y')$$

As described above, with respect to each of the sets of the corresponding local area limited regions, the sizes of the template region and the search region are reduced in stages, and the shift quantity (+Δxi, +Δyi), where i=1, 2, . . . , between the center points of the corresponding local area limited regions in the first image P1" and the second image P2 is calculated. The shift quantity (+Δxi, +Δyi), where i=1, 2, . . . , may be represented by the formula shown below.

$$(+\Delta xi, +\Delta yi) = (x°i - x0i, y°i - y0i)$$
$$= (\Delta xi + \Delta x'i + \Delta x''i, \Delta yi + \Delta y'i + \Delta y''i)$$

The staged template matching processing means 16a calculates the ultimate shift quantity (+Δxi, +Δyi) with respect to each of the center points of the local area limited regions in the second image P2. As described above, with respect to each of the center points of the local area limited regions, which were not selected as the local area limited regions to be subjected to the position re-matching processing, the shift quantity (+Δxi, +Δyi) is uniformly set to be (0, 0).

Also, in accordance with the shift quantities (+Δxi, +Δyi) of the center points of the respective ROI's in the second image P2, the staged template matching processing means 16a calculates the shift quantities of all of the pixels in each ROI in the second image P2 by performing for example, linear interpolating operations utilizing the shift quantities of the four neighboring points (the center points of the respective ROI's) Alternatively, in lieu of the linear interpolating operations, one of other interpolating operations, such as spline interpolation, Bezier interpolation, and NURBS interpolation (weighted B spline interpolation, may be employed. Also, the number of the neighboring points utilized in the interpolating operations is not limited to four and may be set appropriately in accordance with the kind of the interpolating operations, and the like. (For example, 16 neighboring points may be utilized.)

Figure 13:
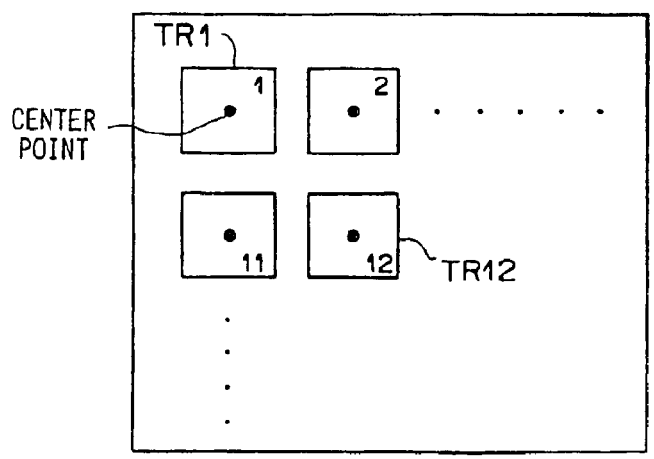
FIG. 13 is an explanatory view showing template regions TR in a second image P2.
Figure 14:
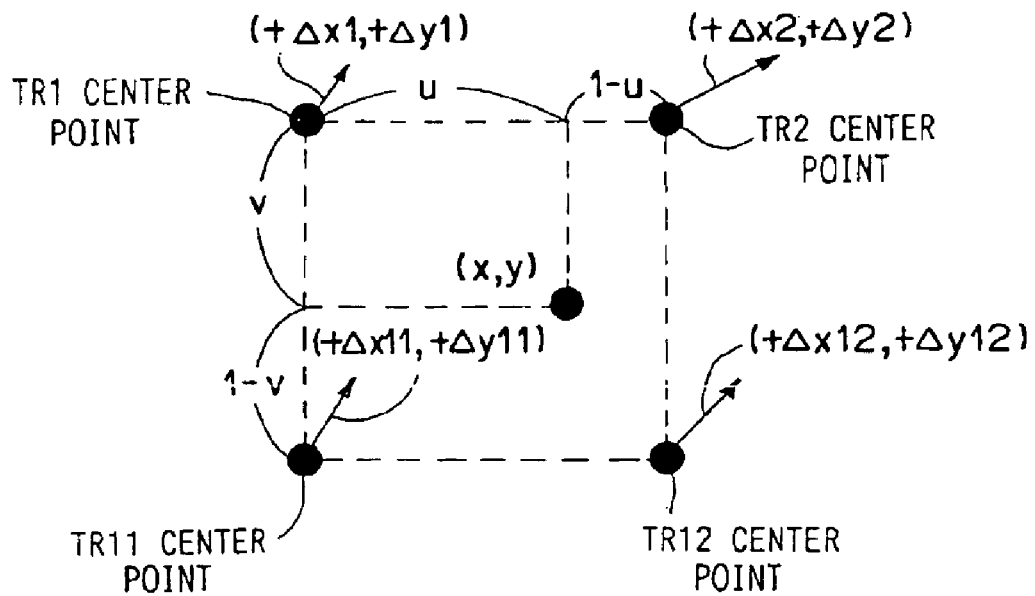
FIG. 14 is an explanatory view showing a linear interpolating operation, in which four neighboring points are utilized.

Specifically, the template regions TR1, TR2, . . . , TR11, TR12, . . . in the second image P2 may be arrayed in the pattern illustrated in FIG. 13. In such cases, as described above, the shift quantity of the center point of the template region TR1 is (+Δx1, +Δy1) [i.e., (+Δxi, +Δyi), where i=1], and the shift quantity of the center point of the template region TR2 is (+Δx2, +Δy2). Also, the shift quantity of the center point of the template region TR11 is (+Δx11, +Δy11), and the shift quantity of the center point of the template region TR12 is (+Δx12, +Δy12). As illustrated in FIG. 14, the shift quantity (+Δx(x), +Δy(y)) of each pixel having the coordinates (x, y), which pixel falls within the range surrounded by the four center points of the four template regions TR1, TR2, TR11, and TR12, may be calculated with the linear interpolating operations in the two-dimensional plane. The calculations may be made with the formulas shown below.

$$\Delta x(x) = (1-u)(1-v)\Delta x1 + u(1-v)\Delta x2 + (1-u)v\Delta x11 + uv\Delta x12$$
$$\Delta y(y) = (1-u)(1-v)\Delta y1 + u(1-v)\Delta y2 + (1-u)v\Delta y11 + uv\Delta y12$$

In the manner described above, the shift quantities (+Δx(x), +Δy(y)) of the pixels having the coordinates (x, y), which pixels fall within the selected ROI in the second image P2 and the regions neighboring with the selected ROI, are calculated by the staged template matching processing means 16a. In accordance with the thus calculated shift quantities (+Δx(x), +Δy(y)), the partial position matching processing means 16b of the position re-matching processing means 16 performs the warping on the pixels, which fall within the selected ROI in the first image P1" and the regions neighboring with the selected ROI. In this manner, the partial position matching processing means 16b performs the matching of positions of the first image P1" and the second image P2.

Figure 15:
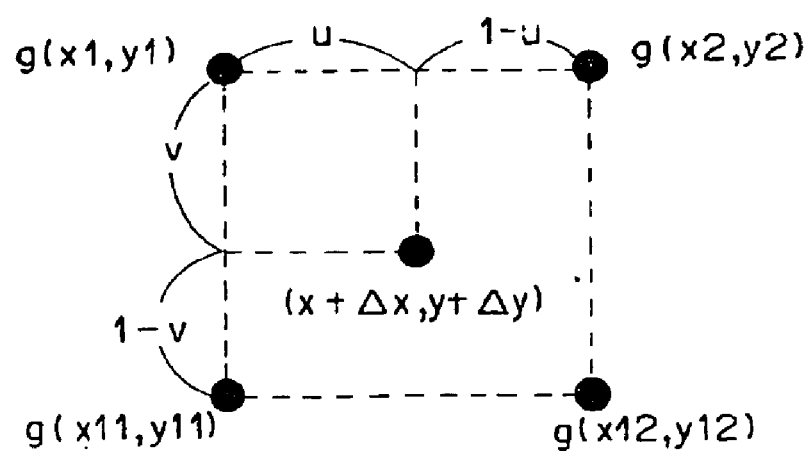
FIG. 15 is an explanatory view showing linear interpolating processing in a two-dimensional plane, in which four neighboring points are utilized, and which is performed with respect to a pixel in a first image P1° having been obtained from the position re-matching processing.

An image P1° (hereinbelow referred to as the first image P1°) is obtained from the warping performed on a certain area of the first image P1". The pixel array in the first image P1° is different from the pixel array in the second image P2. Therefore, in cases where it is considered that, for example, a subtraction process will be performed on corresponding pixels in the two images, and the image will be displayed, it is necessary for the pixel array in the first image P1° to be caused to coincide with the pixel array in the second image P2, which acts as the reference image. Accordingly, as illustrated in FIG. 15, the partial position matching processing means 16b performs linear interpolating processing in the two-dimensional plane on the pixels in the first image P1° and calculates the pixel values with the formula shown below.

$$g(x+\Delta x, y+\Delta y)=(1-u)(1-v)g(x1, y1)+u(1-v)g(x2, y2)+(1-u)vg(x11, y11)+uvg(x12, y12)$$

Figure 17:
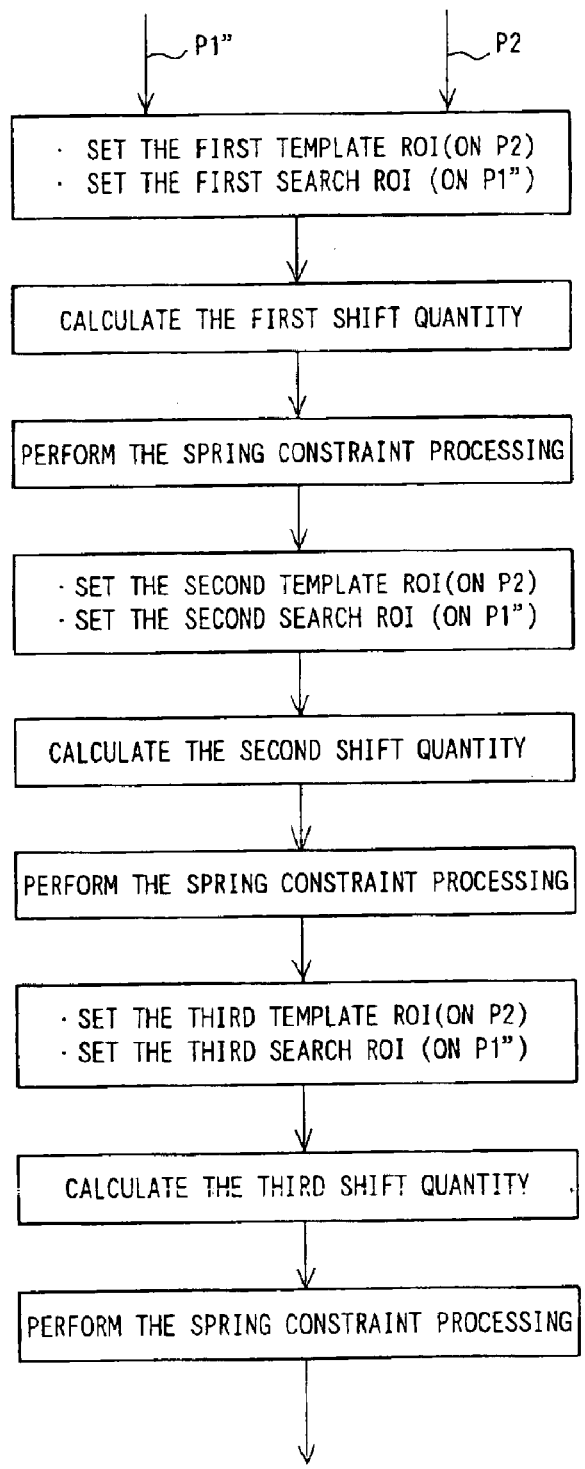
FIG. 17 is a flow chart showing position re-matching processing, which is performed in a second embodiment of the apparatus for matching positions of images in accordance with the present invention.

A second embodiment of the apparatus for matching positions of images in accordance with the present invention will be described hereinbelow. Basically, the second embodiment of the apparatus for matching positions of images in accordance with the present invention is constituted and operates in the same manner as that in the first embodiment described above, except for the features described below. The second embodiment of the apparatus for matching positions of images in accordance with the present invention has the general constitution as illustrated in FIG. 2. FIG. 17 shows a processing flow performed by the staged template matching processing means 16a of the position re-matching processing means 16 in the second embodiment.

In the second embodiment, the staged template matching processing means 16a of the position re-matching processing means 16 operates in the manner described below. Specifically, in the same manner as that in the staged template matching processing means 16a employed in the first embodiment described above, in each of the stages associated with the operation for reducing the sizes of the template region and the search region in stages, the staged template matching processing means 16a in the second embodiment calculates the corresponding position relationship of each stage. Thereafter, the staged template matching processing means 16a in the second embodiment performs spring constraint processing and calculates a spring constraint processed corresponding position relationship in each stage. The spring constraint processed corresponding position relationship, which has thus been calculated, is taken as the corresponding position relationship in each stage. Also, the staged template matching processing means 16a iterates the operations for successively calculating the spring constraint processed corresponding position relationships in the respective stages and thereby calculates the ultimate corresponding position relationship.

More specifically, as illustrated in FIG. 17, the staged template matching processing means 16a in the second embodiment performs the processing described below.

(1) As for the second image P2 acting as the reference image, with respect to each ROI in the second image P2, the staged template matching processing means 16a sets the first template region TR (one of TR1, TR2, . . . ), which has its center point at the center point having coordinates (x0, y0) in the ROI. By way of example, the first template region TR may have a rectangular shape having a size of 80 pixels (in the vertical direction)×80 pixels (in the horizontal direction). Also, as for the first image P1", with respect to each ROI in the first image P1", the staged template matching processing means 16a sets the first search region RR (one of RR1, RR2, . . . ), which has its center point at the same coordinates (x0, y0) as the coordinates of the center point of the first template region TR and is larger than the first template region TR. By way of example, the first search region RR may have a rectangular shape having a size of 92 pixels (in the vertical direction)×92 pixels (in the horizontal direction). Further, with respect to each of the sets of the first template regions TR, TR, . . . and the corresponding first search regions RR, RR, . . . (the set of TR1 and RR1, the set of TR2 and RR2, and so on), the staged template matching processing means 16a determines the first subregion tR within the first search region RR, in which first subregion the degree of image pattern coincidence with the corresponding first template region TR is high. (At this time, as the index representing the degree of image pattern coincidence, for example, the normalized cross correlation value may be employed.) Furthermore, the staged template matching processing means 16a calculates the first position relationship, which is the corresponding position relationship between the first template region TR and the first subregion tR. In accordance with the first position relationship, the staged template matching processing means 16a calculates the first shift quantity (+Δx, +Δy), which is the translation quantity for causing the first template region TR to coincide with the first subregion tR. Also, the staged template matching processing means 16a calculates a shift quantity with respect to each of sets of small regions, which have been set around the first template region TR, and the corresponding small regions, which have been set around the first subregion tR. Further, the staged template matching processing means 16a performs the spring constraint processing in accordance with the first shift quantity (+Δx, +Δy) and the shift quantities having been calculated with respect to the sets of the small regions. In this manner, the staged template matching processing means 16a calculates a first spring constraint processed shift quantity (+ΔX, +ΔY).

(2) Thereafter, as for the second image P2, in accordance with the first spring constraint processed shift quantity (+ΔX, +ΔY), the staged template matching processing means 16a sets a second template region TR' (one of TR'1, TR'2, . . . ), which has its center point at the original center point having the coordinates (x0, y0). By way of example, the second template region TR' may have a rectangular shape having a size of 48 pixels (in the vertical direction)×48 pixels (in the horizontal direction). Also, as for the first image P1", the staged template matching processing means 16a sets a second search region RR'(one of RR'1, RR'2, . . . ) having its center point at a position having coordinates (x', y') [=(x0+ΔX, y0+ΔY)], which position has been translated by the first spring constraint processed shift quantity (+ΔX, +ΔY) from the center point having the coordinates (x0, y0) in the first subregion tR. The second search region RR' is larger than the second template region TR' and is smaller than the first search region RR. By way of example, the second search region RR' may have a rectangular shape having a size of 56 pixels (in the vertical direction)×56 pixels (in the horizontal direction). Further, with respect to each of the sets of the second template regions TR', TR', . . . and the corresponding second search regions RR', RR', . . . (a set of TR'1 and RR'1, a set of TR'2 and RR'2, and so on), the staged template matching processing means 16a determines a second subregion tR' within the second search region RR', in which second subregion the degree of image pattern coincidence with the corresponding second template region TR' is high. (At this time, as an index representing the degree of image pattern coincidence, for example, the total sum of the absolute values of the differences between pixel values may be employed.) Furthermore, the staged template matching processing means 16a calculates a second position relationship, which is the corresponding position relationship between the second template region TR' and the second subregion tR'. In accordance with the second position relationship, the staged template matching processing means 16a calculates a second shift quantity (+Δx', +Δy'), which is a translation quantity for causing the second template region TR' to coincide with the second subregion tR'. Also, the staged template matching processing means 16a calculates a shift quantity with respect to each of sets of small regions, which have been set around the second template region TR', and the corresponding small regions, which have been set around the second subregion tR'. Further, the staged template matching processing means 16a performs the spring constraint processing in accordance with the second shift quantity (+Δx', +Δy') and the shift quantities having been calculated with respect to the sets of the small regions. In this manner, the staged template matching processing means 16a calculates a second spring constraint processed shift quantity (+ΔX', +ΔY').

(3) Thereafter, as for the second image P2, in accordance with the second spring constraint processed shift quantity (+ΔX', +ΔY'), the staged template matching processing means 16a sets a third template region TR" (one of TR"1, TR"2, ...), which has its center point at the original center point having the coordinates (x0, y0). By way of example, the third template region TR" may have a rectangular shape having a size of 16 pixels (in the vertical direction)×16 pixels (in the horizontal direction). Also, as for the first image P1", the staged template matching processing means 16a sets a third search region RR" (one of RR"1, RR"2, ...) having its center point at a position having coordinates (x", y") [=(x'+ΔX', y'+ΔY')=(x0+ΔX+ΔX', y0+ΔY+ΔY')], which position has been translated by the second spring constraint processed shift quantity (+ΔX', +ΔY') from the center point having the coordinates (x', y') in the second subregion tR'. The third search region RR" is larger than the third template region TR" and is smaller than the second search region RR'. By way of example, the third search region RR" may have a rectangular shape having a size of 20 pixels (in the vertical direction)×20 pixels (in the horizontal direction). Further, with respect to each of the sets of the third template regions TR", TR", ... and the corresponding third search regions RR", RR", ... (a set of TR"1 and RR"1, a set of TR"2 and RR"2, and so on), the staged template matching processing means 16a determines a third subregion tR" within the third search region RR", in which third subregion the degree of image pattern coincidence with the corresponding third template region TR" is high. (At this time, as an index representing the degree of image pattern coincidence, for example, the total sum of the absolute values of the differences between pixel values may be employed.) Furthermore, the staged template matching processing means 16a calculates a third position relationship, which is the corresponding position relationship between the third template region TR" and the third subregion tR". In accordance with the third position relationship, the staged template matching processing means 16a calculates a third shift quantity (+Δx", +Δy"), which is a translation quantity for causing the third template region TR" to coincide with the third subregion tR". Also, the staged template matching processing means 16a calculates a shift quantity with respect to each of sets of small regions, which have been set around the third template region TR", and the corresponding small regions, which have been set around the third subregion tR". Further, the staged template matching processing means 16a performs the spring constraint processing in accordance with the third shift quantity (+Δx", +Δy") and the shift quantities having been calculated with respect to the sets of the small regions. In this manner, the staged template matching processing means 16a calculates a third spring constraint processed shift quantity (+ΔX", +ΔY").

(4) Thereafter, with respect to the center point of each ROI (each of ROI1, ROI2, ...), the staged template matching processing means 16a calculates an ultimate translation quantity (i.e., an ultimate shift quantity), (+ΔXi, +ΔYi) where i=1, 2, ... [=first spring constraint processed shift quantity+second spring constraint processed shift quantity+third spring constraint processed shift quantity].

How the spring constraint processing is performed will be described hereinbelow.

As illustrated in FIG. 18, with respect to a template ROI (in this case, TR12), which has its center point at the center point having the coordinates (x0, y0) in the local area limited region associated with the high degree of shift, and a group of surrounding template ROI's (in this case, eight regions of TR1, TR2, TR3, TR11, TR13, TR23, TR22, and TR21), which surround the template ROI (TR12) in a onefold manner, a shift vector (i.e., a shift quantity) of each of the surrounding template ROI's and the shift vector (i.e., the shift quantity) of the template ROI (TR12), which is a center region, are constrained with each other by a virtual spring. In this manner, the shift vectors of the surrounding template ROI's are balanced with one another by constraining forces of the respective springs.

Specifically, the shift vector of the template ROI (TR12), which is the center region, may be represented by (x(2, 2), y(2, 2)). The shift vector of each of the surrounding template ROI's may be represented by (x(2+k, 2+l), y(2+k, 2+l)). Also, a spring constant between the shift vector of the template ROI (TR12), which is the center region, and the shift vector of each of the surrounding template ROI's may be represented by a(k, l). In such cases, by the balance of the spring constraining forces, the shift quantity of the template ROI (TR12), which is the center region, is corrected by Δx(2, 2) in the x direction and by Δy(2, 2) in the y direction. More specifically, a pulling phenomenon in accordance with the differences in shift vector occurs due to the spring constraining forces between the shift vector (x(2, 2), y(2, 2)) of the template ROI (TR12), which is the center region, and the shift vectors (x(2+k, 2+l), y(2+k, 2+l)) of the eight surrounding template ROI's. As a result, the shift vector (x(2, 2), y(2, 2)) of the template ROI (TR12), which is the center region, is corrected by a vector (Δx(2, 2), Δy(2, 2)). The correction quantity (Δx(2, 2), Δy(2, 2)) may be represented by Formulas (1) and (2) shown below.

$$\Delta x(2, 2) = \sum_{k,l}^{8} [a(k, l) \times \{x(2 + k, 2 + l) - x(2, 2)\}] \quad (1)$$

$$\Delta y(2, 2) = \sum_{k,l}^{9} [a(k, l) \times \{y(2 + k, 2 + l) - y(2, 2)\}] \quad (2)$$

Also, a shift vector (nx(2, 2), ny(2, 2)) after being corrected by the correction quantity may be calculated with Formulas (3) and (4) shown below.

$$nx(2, 2) = x(2, 2) + b \cdot \Delta x(2, 2) \quad (3)$$

$$ny(2, 2) = y(2, 2) + b \cdot \Delta y(2, 2) \quad (4)$$

where b represents a fixed number (0<b≦1).

As described above, in cases where the template ROI (TR12) is taken as the center region, the shift vector of the template ROI (TR12) may be corrected by the correction quantity ($\Delta x(2, 2)$, $\Delta y(2, 2)$). As for a shift vector ($x(i, j)$, $y(i, j)$) of a template ROI (TRij), a correction quantity ($\Delta x(i, j)$, $\Delta y(i, j)$) may be represented by Formulas (5) and (6) shown below.

$$\Delta x(i, j) = \sum_{k,l}^{8} [a(k, l) \times \{x(i+k, j+l) - x(i, j)\}] \quad (5)$$

$$\Delta y(i, j) = \sum_{k,l}^{8} [a(k, l) \times \{y(i+k, j+l) - y(i, j)\}] \quad (6)$$

Also, a shift vector ($nx(i, j)$, $ny(i, j)$) of each template ROI (TRij) after being corrected by the correction quantity ($\Delta x(i, j)$, $\Delta y(i, j)$) may be calculated with Formulas (7) and (8) shown below.

$$nx(i, j) = x(i, j) + b \cdot \Delta x(i, j) \quad (7)$$

$$ny(i, j) = y(i, j) + b \cdot \Delta y(i, j) \quad (8)$$

A total sum $\Sigma a(k, l)$ of the spring constants $a(k, l)$ of the eight springs with respect to one center region should preferably be normalized to 1.

In the embodiment described above, as the surrounding template ROI's, which constrain one template ROI located at the center region, the eight template ROI's surrounding the center region in a onefold manner are employed. Alternatively, one template ROI located at the center region may be constrained with 24 template ROI's, which contain the eight template ROI's surrounding the center region in a onefold manner and 16 template ROI's located on the side outward from the eight template ROI's. In general, in cases where the number of the constraining template ROI's is represented by Nc, Formulas (5) and (6) shown above may be expressed as Formulas (9) and (10) shown below.

$$\Delta x(i, j) = \sum_{k,l}^{Nc} [a(k, l) \times \{x(i+k, j+l) - x(i, j)\}] \quad (9)$$

$$\Delta y(i, j) = \sum_{k,l}^{Nc} [a(k, l) \times \{y(i+k, j+l) - y(i, j)\}] \quad (10)$$

As described above, the shift vector of each template ROI and the shift vectors of the surrounding template ROI's are pulled by each other with the spring constraining forces and are thereby balanced. In this manner, the shift vector is capable of being smoothed. Therefore, even if problems occur accidentally in that the shift vector of the template ROI is directed to a direction markedly different from the directions of the shift vectors of the surrounding template ROI's or has a shift quantity markedly larger than the shift quantities of the surrounding template ROI's, the adverse effects of the problems are capable of being suppressed.

In the second embodiment, the staged template matching processing means 16a calculates the ultimate shift quantity (+$\Delta$Xi, +$\Delta$Yi) of the center point of each local area limited region in the second image P2 by utilizing the spring constraint processing in the manner described above. The features in the second embodiment other than the processing in the staged template matching processing means 16a are the same as those in the first embodiment described above.

In the second embodiment described above, the spring constraint processing is employed in all of the stages in the staged template matching processing means 16a of the position re-matching processing means 16. However, the image position matching apparatus in accordance with the present invention is not limited to the second embodiment. For example, the spring constraint processing may be employed in one stage or two stages among the stages in the staged template matching processing means 16a of the position re-matching processing means 16.

Figure 16:
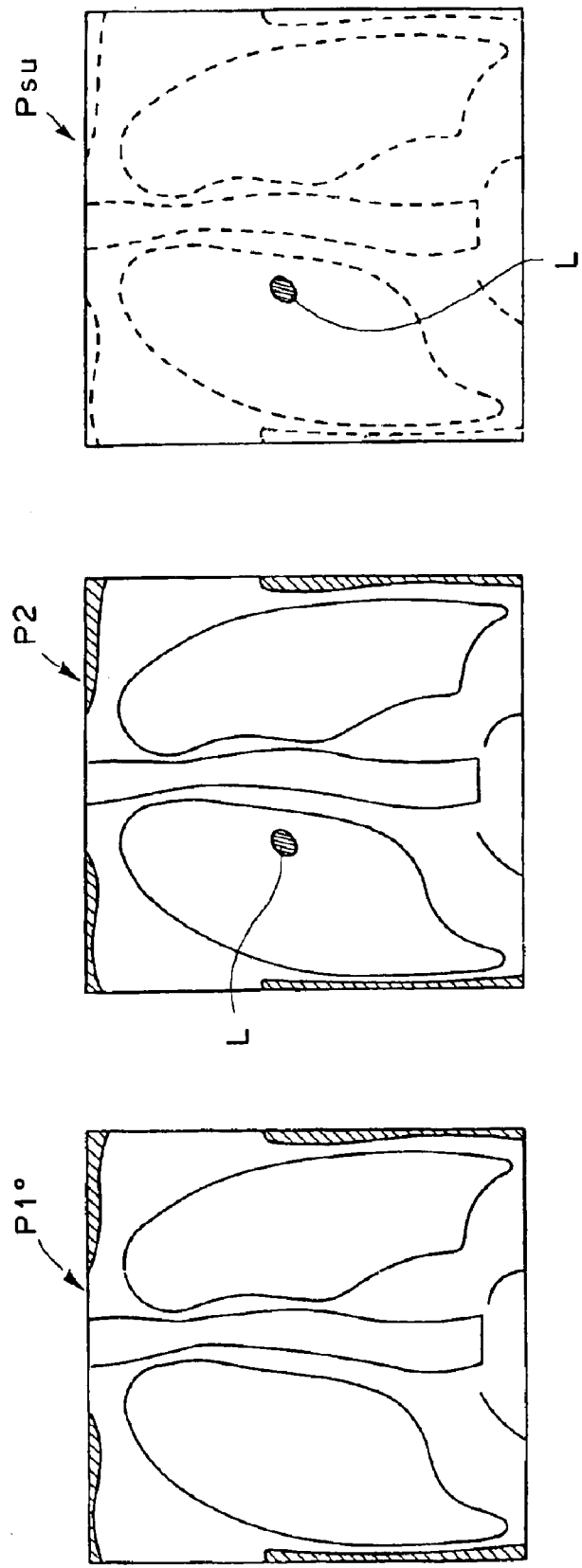
FIG. 16A is a schematic view showing the first image P1°.
FIG. 16B is a schematic view showing the second image P2.
FIG. 16C is a schematic view showing a subtraction image Psu having been obtained from the first image P1° of FIG. 16A and the subtraction image Psu of FIG. 16B.

As described above, with each of the two embodiments of the image position matching apparatus in accordance with the present invention, the approximate position matching processing is performed with respect to the entire areas of the two images P1 and P2, and only the certain local area limited regions, between which the degree of shift is high even after the approximate position matching processing has been performed, are selected. Also, the position re-matching processing is performed with respect to only the selected local area limited regions and the regions neighboring with the selected local area limited regions. In this manner, in cases where a shift remains between certain local area limited regions after the approximate position matching processing has been performed, the degree of shift between the local area limited regions, between which the degree of shift was high, is capable of being suppressed. Therefore, the degree of shift between the entire areas of the images is capable of being suppressed more reliably than with the conventional image position matching techniques, and the position matching accuracy is capable of being enhanced. Accordingly, the two images P1° and P2, whose positions have been accurately matched with each other by the image position matching apparatus in accordance with the present invention, may be utilized for inter-image operation processing, in which the operation processing is performed on corresponding pixels in the two images P1° and P2. In this manner, an inter-image operation processed image may be obtained. By way of example, as illustrated in FIG. 16C, a subtraction image Psu may be obtained by subtracting the image P1° shown in FIG. 16A from the second image P2 shown in FIG. 16B. In FIGS. 16B and 16C, a reference character L represents a tumor pattern appearing in the second image P2 and the subtraction image Psu. In the inter-image operation processed image, which has thus been obtained, an artifact occurring due to a shift between the two images has been suppressed markedly. In this manner, an image appropriate for making a diagnosis of an illness, or the like, is capable of being obtained.

What is claimed is:

1. A method of matching positions of images, in which positions of two images of a single same object are matched with each other, the method comprising the steps of:

i) performing approximate position matching processing with respect to entire areas of the two images, ii) selecting local area limited regions, between which a degree of shift is high, in the two images, whose positions have been approximately matched with each other by the approximate position matching processing, and iii) performing position re-matching processing with respect to at least the local area limited regions, which have thus been selected.

2. A method as defined in claim 1 wherein the approximate position matching processing is global position matching processing for performing transform processing comprising at least one kind of processing, which is among rotating processing, parallel translation, and image size enlargement or reduction processing, on an entire area of at least either one of the two images.

3. The method of claim 2, wherein the position re-matching process comprises:

setting a re-matching template region in one of the two images;

setting a re-matching search region in the other image corresponding to the re-matching template region;

determining a re-matching subregion within the re-matching search region;

calculating a positional relationship between the re-matching template region and the re-matching subregion;

performing iterating operations wherein sizes of the re-matching template region and the re-matching search region are successively reduced and the calculation of the positional relationship is performed after each reduction; and performing transform processing on at least one image in accordance with the results of the positional relationship calculations.

4. A method as defined in claim 1 wherein the approximate position matching processing is local position matching processing for:

setting a plurality of template regions, which are small regions, in one of the two images, setting a plurality of search regions, each of which corresponds to one of the template regions having been set in the one image and is larger than each of the template regions, in the other image, determining a subregion in each of the search regions, in which subregion an image pattern approximately coincides with the image pattern within the corresponding template region, and performing nonlinear strain transform processing on the entire area of at least either one of the two images and in accordance with corresponding position relationships between the subregions, which have thus been determined, and the corresponding template regions, such that the two images approximately coincide with each other.

5. The method of claim 4, wherein the position re-matching process comprises:

setting a re-matching template region in one of the two images;

setting a re-matching search region in the other image corresponding to the re-matching template region;

determining a re-matching subregion within the re-matching search region;

calculating a positional relationship between the re-matching template region and the re-matching subregion;

performing iterating operations wherein sizes of the re-matching template region and the re-matching search region are successively reduced and the calculation of the positional relationship is performed after each reduction; and performing transform processing on at least one image in accordance with the results of the positional relationship calculations.

6. A method as defined in claim 1 wherein the approximate position matching processing is a processing comprising:

a) global position matching processing for performing transform processing comprising at least one kind of processing, which is among rotating processing, parallel translation, and image size enlargement or reduction processing, on an entire area of at least either one of the two images, and b) local position matching processing for:

selling a plurality of template regions, which are small regions, in one of the two images, whose positions have been matched with each other in a global manner by the global position matching processing, setting a plurality of search regions, each of which corresponds to one of the template regions having been set in the one image and is larger than each of the template regions, in the other image, determining a subregion in each of the search regions, in which subregion an image pattern approximately coincides with the image pattern within the corresponding template region, and performing nonlinear strain transform processing on the entire area of at least either one of the two images and in accordance with corresponding position relationships between the subregions, which have thus been determined, and the corresponding template regions, such that the two images approximately coincide with each other.

7. A method as defined in claim 1, 2, 4, or 6 wherein the position re-matching processing is a processing for:

setting a template region in the local area limited region in one of the two images, the setting of the template region being performed with respect to each of sets of the corresponding local area limited regions in the two images, between which local area limited regions the degree of shift is high, setting a search region in the local area limited region in the other image, the setting of the search region being performed with respect to each of the sets of the corresponding local area limited regions in the two images, between which local area limited regions the degree of shift is high, determining a subregion within the search region, in which subregion a degree of image pattern coincidence with the corresponding template region is high, calculating a corresponding position relationship between the template region and the corresponding subregion, iterating operations, in which sizes of the template region and the search region are reduced in stages, the template region and the search region having the sizes reduced in stages are set in accordance with the thus calculated corresponding position relationship, and a corresponding position relationship between the template region and the corresponding subregion is calculated successively, an ultimate corresponding position relationship being thereby calculated with respect to each of the sets of the corresponding local area limited regions in the two images, between which local area limited regions the degree of shift is high, and performing transform processing on at least either one of the two images, whose positions have been approximately matched with each other by the approximate position matching processing, and in accordance with the ultimate corresponding position relationships that have been calculated ultimately with respect to the sets of the corresponding local area limited regions in the two images, between which local area limited regions the degree of shift is high, such that the corresponding local area limited regions in the two images, between which local area limited regions the degree of shift is high, approximately coincide with each other.

8. A method as defined in claim 1, 2, 4, or 6 wherein the selection of the local area limited regions, between which the degree of shift is high, is performed by setting a plurality of sets of corresponding local area limited regions in the two images, calculating the degree of shift between the corresponding local area limited regions in the two images and with respect to each of the sets of the corresponding local area limited regions in the two images, and selecting the local area limited regions, between which the degree of shift is high, in the two images in accordance with the degrees of shift, which have been calculated with respect to the sets of the corresponding local area limited regions in the two images.

9. A method as defined in claim 8 wherein the degree of shift between the corresponding local area limited regions is calculated as a total sum value of absolute values of pixel value differences between corresponding pixels in the corresponding local area limited regions in the two images, and the selection of the local area limited regions, between which the degree of shift is high, is made by performing threshold value processing on the total sum value of the absolute values of the pixel value differences between the corresponding pixels in the corresponding local area limited regions.

10. A method as defined in claim 1, 2, 4, or 6 wherein the two images are images, which have been recorded in a time series manner at different points of time.

11. A method as defined in claim 1, 2, 4, or 6 wherein the two images are medical radiation images.

12. The method of claim 6, wherein the position re-matching process comprises:

setting a re-matching template region in one of the two images;

setting a re-matching search region in the other image corresponding to the re-matching template region;

determining a re-matching subregion within the re-matching search region;

calculating a positional relationship between the re-matching template region and the re-matching sub-region;

performing iterating operations wherein sizes of the re-matching template region and the re-matching search region are successively reduced and the calculation of the positional relationship is performed after each reduction; and performing transform processing on at least one image in accordance with the results of the positional relationship calculations.

13. The method of claim 1, wherein the position re-matching process comprises:

setting a re-matching template region in one of the two images;

setting a re-matching search region in the other image corresponding to the re-matching template region;

determining a re-matching subregion within the re-matching search region;

calculating a positional relationship between the re-matching template region and the re-matching sub-region;

performing iterating operations wherein sizes of the re-matching template region and the re-matching search region are successively reduced and the calculation of the positional relationship is performed after each reduction; and performing transform processing on at least one image in accordance with the results of the positional relationship calculations.

14. An apparatus for matching positions of images, in which positions of two images of a single same object are matched with each other, the apparatus comprising:

i) approximate position matching processing means for performing approximate position matching processing with respect to entire areas of the two images, ii) region selecting means for selecting local area limited regions, between which a degree of shift is high, in the two images, whose positions have been approximately matched with each other by the approximate position matching processing, and iii) position re-matching processing means for performing position re-matching processing with respect to at least the local area limited regions, which have been selected by the region selecting means.

15. An apparatus as defined in claim 14 wherein the approximate position matching processing means is global position matching processing means, which performs global position matching processing for performing transform processing comprising at least one kind of processing, which is among rotating processing, parallel translation, and image size enlargement or reduction processing, on an entire area of at least either one of the two images.

16. An apparatus as defined in claim 14 wherein the approximate position matching processing means comprises:

a) template matching processing means for:

setting a plurality of template regions, which are small regions, in one of the two images, setting a plurality of search regions, each of which corresponds to one of the template regions having been set in the one image and is larger than each of the template regions, in the other image, and determining a subregion in each of the search regions, in which subregion an image pattern approximately coincides with the image pattern within the corresponding template region, and b) local position matching processing means, which performs local position matching processing for performing nonlinear strain transform processing on the entire area of at least either one of the two images and in accordance with corresponding position relationships between the subregions and the corresponding template regions, the corresponding position relationships having been obtained from the template matching processing means, such that the two images approximately coincide with each other.

17. An apparatus as defined in claim 14 wherein the approximate position matching processing means comprises:

a) global position matching processing means, which performs global position matching processing for performing transform processing comprising at least one kind of processing, which is among rotating processing, parallel translation, and image size enlargement or reduction processing, on an entire area of at least either one of the two images, b) template matching processing means for:

setting a plurality of template regions, which are small regions, in one of the two images, whose positions have been matched with each other in a global manner by the global position matching processing, setting a plurality of search regions, each of which corresponds to one of the template regions having been set in the one image and is larger than each of the template regions, in the other image, and determining a subregion in each of the search regions, in which subregion an image pattern approximately coincides with the image pattern within the corresponding template region, and c) local position matching processing means, which performs local position matching processing for performing nonlinear strain transform processing on the entire area of at least either one of the two images and in accordance with corresponding position relationships between the subregions and the corresponding template regions, the corresponding position relationships having been obtained from the template matching processing means, such that the two images approximately coincide with each other.

18. An apparatus as defined in claim 14, 15, 16, or 17 wherein the position re-matching processing means comprises:

a) staged template matching processing means for:

setting a template region in the local area limited region in one of the two images, the setting of the template region being performed with respect to each of sets of the corresponding local area limited regions in the two images, between which local area limited regions the degree of shift is high, setting a search region in the local area limited region in the other image, the setting of the search region being performed with respect to each of the sets of the corresponding local area limited regions in the two images, between which local area limited regions the degree of shift is high, determining a subregion within the search region, in which subregion a degree of image pattern coincidence with the corresponding template region is high, calculating a corresponding position relationship between the template region and the corresponding subregion, and iterating operations, in which sizes of the template region and the search region are reduced in stages, the template region and the search region having the sizes reduced in stages are set in accordance with the thus calculated corresponding position relationship, and a corresponding position relationship between the template region and the corresponding subregion is calculated successively, in order to calculate an ultimate corresponding position relationship with respect to each of the sets of the corresponding local area limited regions in the two images, between which local area limited regions the degree of shift is high, and b) partial position matching processing means for performing transform processing on at least either one of the two images, whose positions have been approximately matched with each other by the approximate position matching processing, and in accordance with the ultimate corresponding position relationships that have been calculated ultimately with respect to the sets of the corresponding local area limited regions in the two images, between which local area limited regions the degree of shift is high, such that the corresponding local area limited regions in the two images, between which local area limited regions the degree of shift is high, approximately coincide with each other.

19. An apparatus as defined in claim 18 wherein the staged template matching processing means is means for:

setting a plurality of small regions around each of the corresponding local area limited regions in the two images, between which local area limited regions the degree of shift is high, in at least one stage among the stages associated with the operation for reducing the sizes of the template region and the search region in stages, calculating a corresponding position relationship between the corresponding small regions in the two images, the calculation being made with respect to each of sets of the corresponding small regions in the two images, constraining the template region and the small regions, which surround the template region, with one another, and/or constraining the corresponding subregion and the small regions, which surround the subregion, with one another, the constraint being performed with constraining forces in accordance with the corresponding position relationship, which has been calculated with respect to the template region and the corresponding subregion, and the corresponding position relationships, which have been calculated with respect to the sets of the corresponding small regions in the two images, calculating a new relative corresponding position relationship with respect to the template region and the corresponding subregion in accordance with the constraining forces, and utilizing the thus calculated new relative corresponding position relationship as the corresponding position relationship between the template region and the corresponding subregion in each of the stages.

20. An apparatus as defined in claim 14, 15, 16, or 17 wherein the region selecting means performs the selection of the local area limited regions, between which the degree of shift is high, by setting a plurality of sets of corresponding local area limited regions in the two images, calculating the degree of shift between the corresponding local area limited regions in the two images and with respect to each of the sets of the corresponding local area limited regions in the two images, and selecting the local area limited regions, between which the degree of shift is high, in the two images in accordance with the degrees of shift, which have been calculated with respect to the sets of the corresponding local area limited regions in the two images.

21. An apparatus as defined in claim 20 wherein the region selecting means performs the selection of the local area limited regions, between which the degree of shift is high, by calculating the degree of shift between the corresponding local area limited regions as a total sum value of absolute values of pixel value differences between corresponding pixels in the corresponding local area limited regions in the two images, and performing threshold value processing on the total sum value of the absolute values of the pixel value differences between the corresponding pixels in the corresponding local area limited regions.

22. An apparatus as defined in claim 14, 15, 16, or 17 wherein the two images are images, which have been recorded in a time series manner at different points of time.

23. An apparatus as defined in claim 14, 15, 16, or 17 wherein the two images are medical radiation images.

* * * * *